United States Patent
Nogi et al.

(10) Patent No.: US 7,447,430 B2
(45) Date of Patent: Nov. 4, 2008

(54) OPTICAL CROSS CONNECT APPARATUS AND OPTICAL TRANSMISSION SYSTEM

(75) Inventors: Yoshio Nogi, Fujisawa (JP); Tomohiro Mori, Yokohama (JP); Yasuyuki Fukashiro, Yokohama (JP); Hideaki Tsushima, Komae (JP)

(73) Assignee: Hitachi Communications Technologies, Ltd., Tokyo (JP)

( * ) Notice: Subject to any disclaimer, the term of this patent is extended or adjusted under 35 U.S.C. 154(b) by 470 days.

(21) Appl. No.: 11/184,988

(22) Filed: Jul. 20, 2005

(65) Prior Publication Data

US 2006/0018656 A1 Jan. 26, 2006

(30) Foreign Application Priority Data

Jul. 20, 2004 (JP) .............................. 2004-211504

(51) Int. Cl.
 H04B 10/00 (2006.01)
 H04B 10/08 (2006.01)
 H04J 14/00 (2006.01)
(52) U.S. Cl. .............................. 398/5; 398/15; 398/17; 398/33; 398/50
(58) Field of Classification Search ...... 398/2, 398/5, 13, 15, 17, 33, 45, 48, 50, 55–57
See application file for complete search history.

(56) References Cited

U.S. PATENT DOCUMENTS

| 5,663,820 | A  | * | 9/1997 | Shiragaki ..................... | 398/50 |
| 6,396,602 | B1 | * | 5/2002 | Kaiser et al. .................. | 398/45 |
| 6,400,477 | B1 | * | 6/2002 | Wellbrook .................... | 398/45 |
| 7,130,540 | B2 | * | 10/2006 | Simmons et al. .............. | 398/49 |
| 7,242,860 | B2 | * | 7/2007 | Ikeda et al. .................... | 398/5 |
| 2003/0133712 | A1 | * | 7/2003 | Arikawa et al. ................ | 398/2 |
| 2004/0037553 | A1 | * | 2/2004 | Ramaswami et al. .......... | 398/5 |

FOREIGN PATENT DOCUMENTS

| JP | 2003-115798 | 4/2003 |
| JP | 2004-040726 | 2/2004 |
| JP | 2004-104188 | 4/2004 |

OTHER PUBLICATIONS

Shoichiro Seno, "Optical Cross Connect Technology for All-Optical Network", PIL Workshop, published Feb. 19, 2003 by Mitsubishi Electric Corp.

* cited by examiner

*Primary Examiner*—Dalzid Singh
(74) *Attorney, Agent, or Firm*—Antonelli, Terry, Stout & Kraus, L.L.P.

(57) ABSTRACT

Disclosed is an optical cross connect apparatus that is applicable to an end office node and relay node in a path. The optical cross connect apparatus includes an optical switch for generating plural optical output signals from plural optical input signals; an optical level monitor section for detecting the optical levels of the optical input signals; and a control section that is connected to the optical switch and the optical level monitor section, includes a path switching management section for retaining a path switching management table, references the path switching management table when the optical input signals detected by the optical level monitor section are found to be OFF, and judges whether the optical switch should be operated.

3 Claims, 16 Drawing Sheets

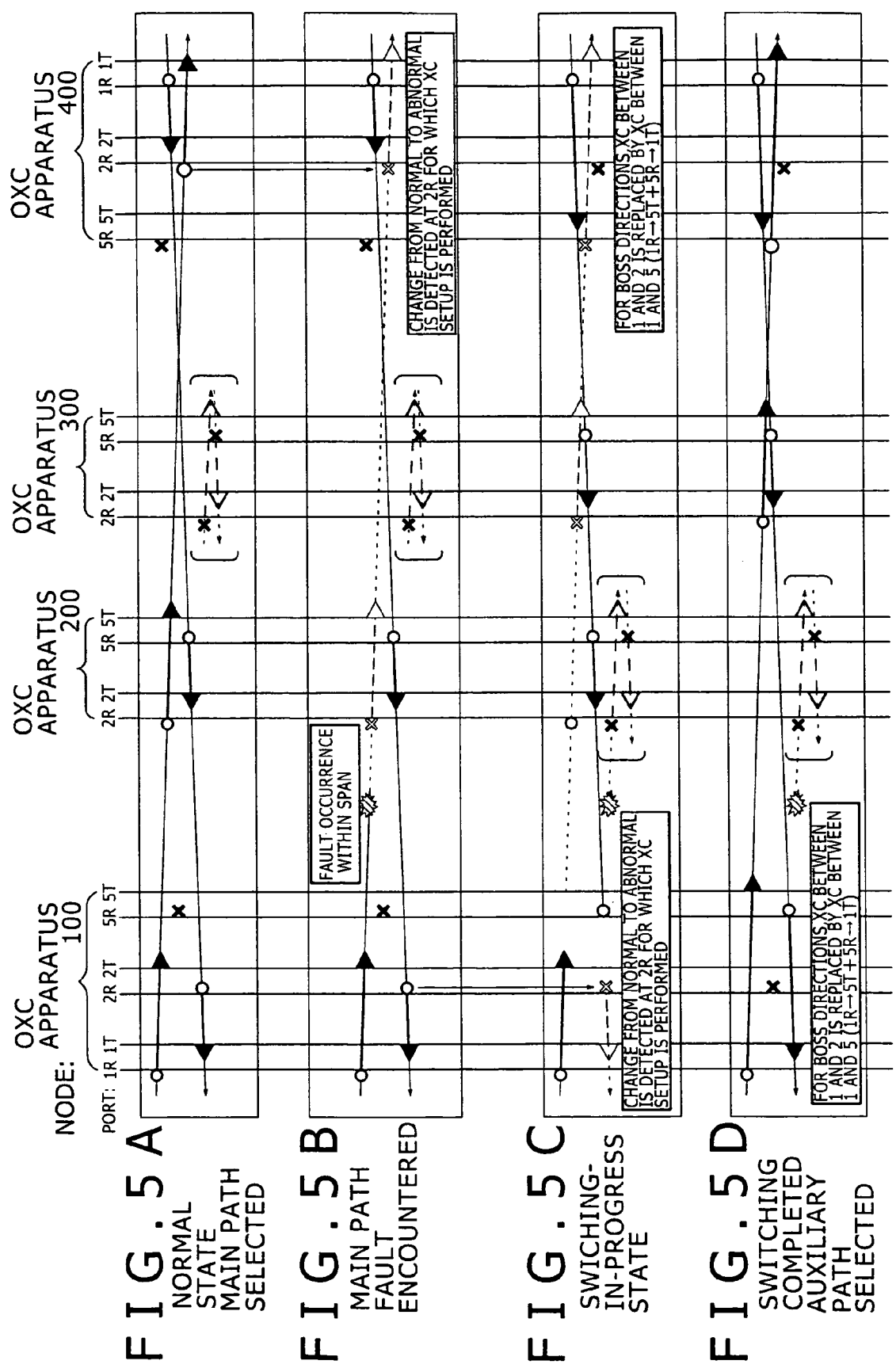

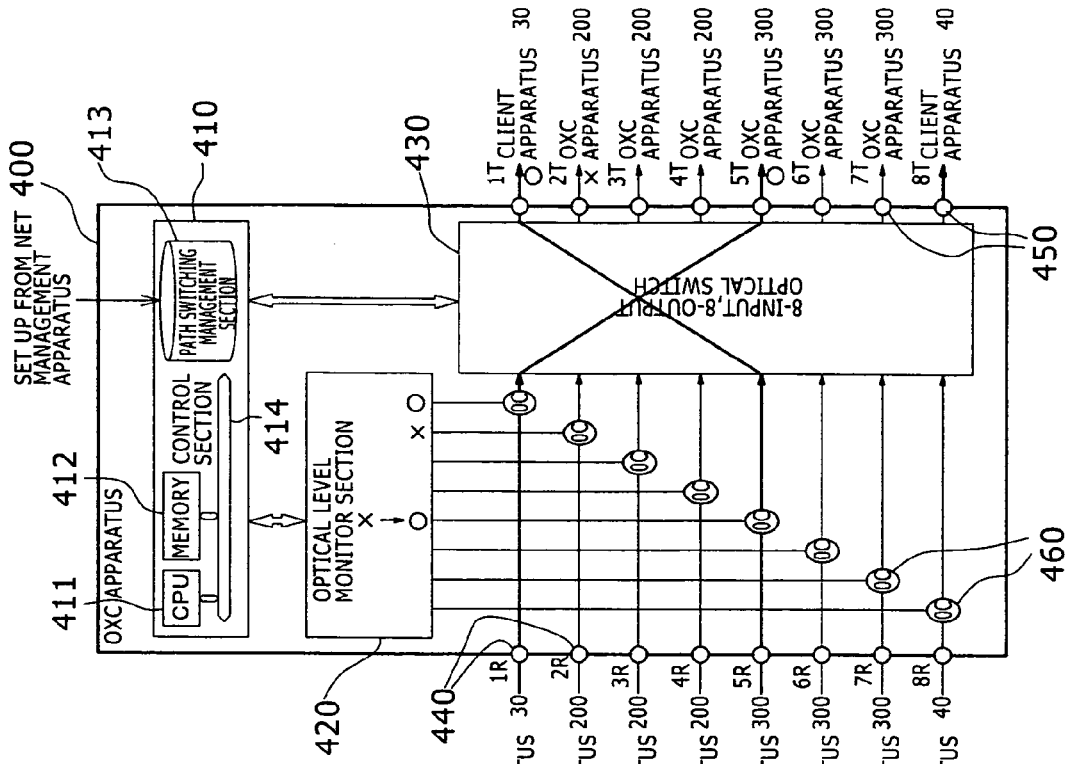
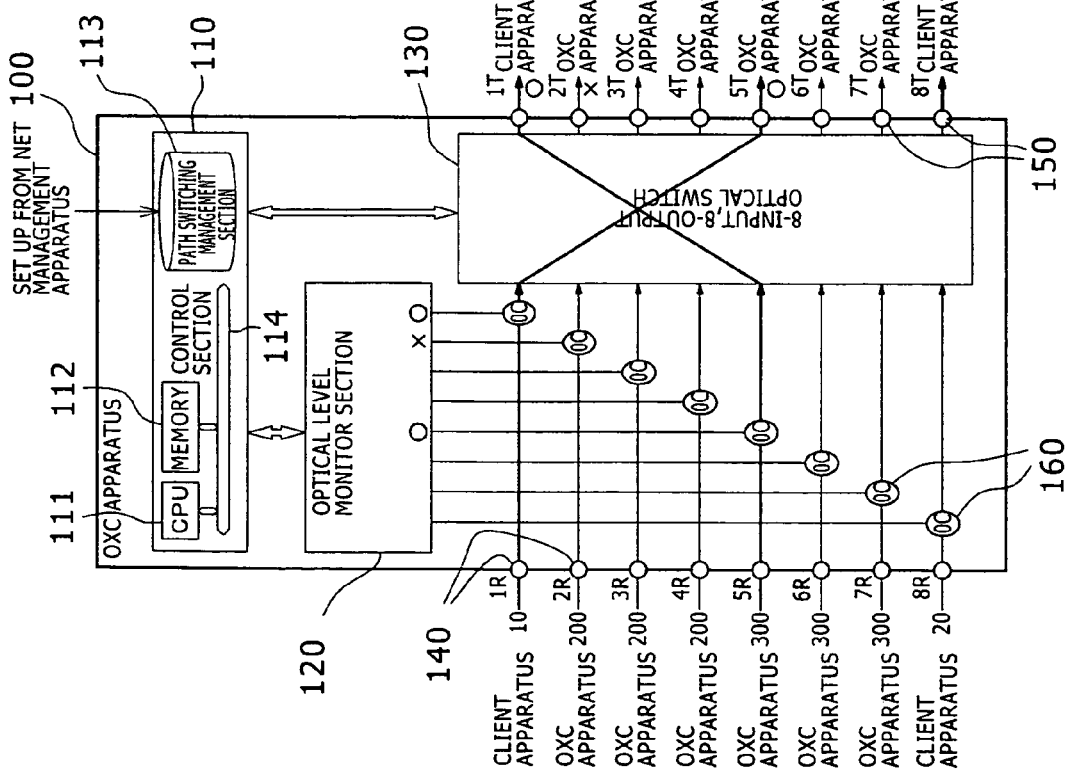

FIG.10

| NO. | SWITCHING STATUS DEFINITION / EVENT | SWITCHING STATUS ID | 1-1-1-1 | 1-1-1-2 | 1-1-2-1 | 1-1-2-2 | 1-2-1-1 | 1-2-1-2 | 1-2-2-1 | 1-2-2-2 | 2-1-1-0 | 2-1-2-0 |
|---|---|---|---|---|---|---|---|---|---|---|---|---|
| | | AUXILIARY SYSTEM PROVISION | PROVIDED | | | | | | | | NOT PROVIDED | |
| | | SELECTED SYSTEM | MAIN | | | | AUXILIARY | | | | MAIN | |
| | | MAIN SYSTEM FAULT DESCRIPTION | NORMAL | | ABNORMAL | | NORMAL | | ABNORMAL | | NORMAL | ABNORMAL |
| | | AUXILIARY SYSTEM FAULT DESCRIPTION | NORMAL | ABNORMAL | NORMAL | ABNORMAL | NORMAL | ABNORMAL | NORMAL | ABNORMAL | | |
| 1 | AUXILIARY XC ADDITION | | | - | - | - | | - | - | - | 1-1-1-2 | 1-1-2-2 |
| 2 | AUXILIARY XC DELETION | | 2-1-1-0 | 2-1-2-0 | - | - | 2-1-1-0* | 2-1-2-0* | - | - | - | - |
| 3 | XC CHANGE FROM MAIN TO AUXILIARY (PATH SWITCHING) | | - | 1-2-2-1 | 1-2-2-2 | - | - | - | - | - | - | - |
| 4 | XC CHANGE FROM AUXILIARY TO MAIN (PATH SWITCHING) | | - | - | - | - | 1-1-1-2 | - | - | 1-1-2-2 | - | - |
| 5 | MAIN SYSTEM FAULT DETECTION | | 1-1-2-2 | - | | | 1-2-2-2 | - | | | 2-1-2-0 | - |
| 6 | MAIN SYSTEM FAULT DETECTION AND AUXILIARY SYSTEM FAULT RECOVERY DETECTION | | - | 1-1-2-1 | | | - | - | | | - | - |
| 7 | MAIN SYSTEM FAULT RECOVERY DETECTION | | | | - | 1-1-1-2 | | | - | 1-2-1-2 | - | 2-1-1-0 |
| 8 | AUXILIARY SYSTEM FAULT DETECTION | | - | 1-1-2-2 | - | - | - | 1-2-2-2 | - | - | - | - |
| 9 | AUXILIARY SYSTEM FAULT DETECTION AND MAIN SYSTEM FAULT RECOVERY DETECTION | | | | 1-1-1-2 | - | | | 1-2-1-2 | - | - | - |
| 10 | AUXILIARY SYSTEM FAULT RECOVERY DETECTION | | - | - | - | 1-1-2-1 | - | - | - | 1-2-2-1 | - | - |

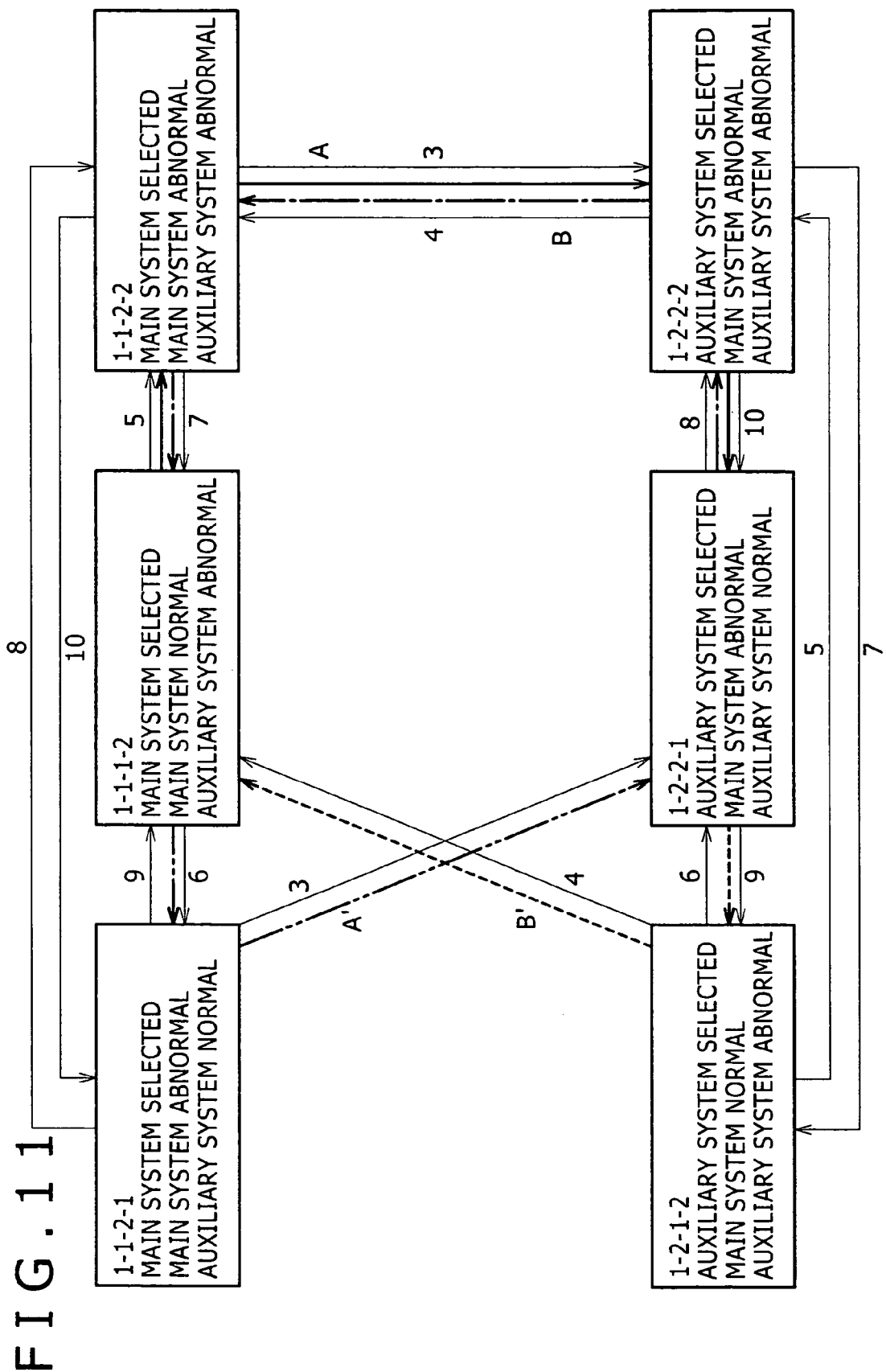

FIG. 12

(1) MAIN PATH SELECTED (OXC APPARATUS 100=MAIN PATH SELECTED, OXC APPARATUS 400=MAIN PATH SELECTED); MAIN PATH NORMAL (a) OXC APPARATUS 100

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
|  |  | T |  | 2R | 5R | SELECTED |
| 0001 | 2 | R | NORMAL | 1T | . | SELECTED |
|  |  | T | . | 1R | . | SELECTED |
| D.C. | 3 | R | D.C. | D.C. | D.C. | D.C. |
|  |  | T | D.C. | D.C. | D.C. | D.C. |
| D.C. | 4 | R | D.C. | D.C. | D.C. | D.C. |
|  |  | T | D.C. | D.C. | D.C. | D.C. |
| 0001 | 5 | R | OFF | 1T | . | NONSELECTED |
|  |  | T | . | 1R | . | NONSELECTED |
| D.C. | 6 | R | D.C. | D.C. | D.C. | D.C. |
|  |  | T | D.C. | D.C. | D.C. | D.C. |
| D.C. | 7 | R | D.C. | D.C. | D.C. | D.C. |
|  |  | T | D.C. | D.C. | D.C. | D.C. |
| D.C. | 8 | R | D.C. | D.C. | D.C. | D.C. |
|  |  | T | D.C. | D.C. | D.C. | D.C. |

(b) OXC APPARATUS 200

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | D.C. | D.C. | D.C. | D.C. |
| 0001 | 2 | R | NORMAL | 5T | . | SELECTED |
|  |  | T | . | 5R | . | SELECTED |
| D.C. | 3 | R | D.C. | D.C. | D.C. | D.C. |
|  |  | T | D.C. | D.C. | D.C. | D.C. |
| D.C. | 4 | R | D.C. | D.C. | D.C. | D.C. |
|  |  | T | D.C. | D.C. | D.C. | D.C. |
| 0001 | 5 | R | NORMAL | 2T | . | SELECTED |
|  |  | T | . | 2R | . | SELECTED |
| D.C. | 6 | R | D.C. | D.C. | D.C. | D.C. |
|  |  | T | D.C. | D.C. | D.C. | D.C. |
| D.C. | 7 | R | D.C. | D.C. | D.C. | D.C. |
|  |  | T | D.C. | D.C. | D.C. | D.C. |
| D.C. | 8 | R | D.C. | D.C. | D.C. | D.C. |
|  |  | T | D.C. | D.C. | D.C. | D.C. |

(2) MAIN PATH SELECTED (OXC APPARATUS 100=MAIN PATH SELECTED, OXC APPARATUS 400=MAIN PATH SELECTED); MAIN PATH FAULTY (a) OXC APPARATUS 100

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
|  |  | T | . | 2R | 5R | SELECTED |
| 0001 | 2 | R | NORMAL | 1T | . | SELECTED |
|  |  | T | . | 1R | . | SELECTED |
| D.C. | 3 | R | D.C. | D.C. | D.C. | D.C. |
|  |  | T | D.C. | D.C. | D.C. | D.C. |
| D.C. | 4 | R | D.C. | D.C. | D.C. | D.C. |
|  |  | T | D.C. | D.C. | D.C. | D.C. |
| 0001 | 5 | R | OFF | 1T | . | NONSELECTED |
|  |  | T | . | 1R | . | NONSELECTED |
| D.C. | 6 | R | D.C. | D.C. | D.C. | D.C. |
|  |  | T | D.C. | D.C. | D.C. | D.C. |
| D.C. | 7 | R | D.C. | D.C. | D.C. | D.C. |
|  |  | T | D.C. | D.C. | D.C. | D.C. |
| D.C. | 8 | R | D.C. | D.C. | D.C. | D.C. |
|  |  | T | D.C. | D.C. | D.C. | D.C. |

(b) OXC APPARATUS 200

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | D.C. | D.C. | D.C. | D.C. |
| 0001 | 2 | R | OFF | 5T | . | SELECTED |
|  |  | T | . | 5R | . | SELECTED |
| D.C. | 3 | R | D.C. | D.C. | D.C. | D.C. |
|  |  | T | D.C. | D.C. | D.C. | D.C. |
| D.C. | 4 | R | D.C. | D.C. | D.C. | D.C. |
|  |  | T | D.C. | D.C. | D.C. | D.C. |
| 0001 | 5 | R | NORMAL | 2T | . | SELECTED |
|  |  | T | . | 2R | . | SELECTED |
| D.C. | 6 | R | D.C. | D.C. | D.C. | D.C. |
|  |  | T | D.C. | D.C. | D.C. | D.C. |
| D.C. | 7 | R | D.C. | D.C. | D.C. | D.C. |
|  |  | T | D.C. | D.C. | D.C. | D.C. |
| D.C. | 8 | R | D.C. | D.C. | D.C. | D.C. |
|  |  | T | D.C. | D.C. | D.C. | D.C. |

FIG. 13

(1) MAIN PASH SELECTED (OXC APPARATUS 100=MAIN PATH SELECTED, OXC APPARATUS 400=MAIN PATH SELECTED) ; MAIN PATH NORMAL (a) OXC APPARATUS 300

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | . | . | . | . |
| 0001 | 2 | R | OFF | ST | . | SELECTED |
|  |  | T | . | SR | . | SELECTED |
| D.C. | 3 | R | D.C. | D.C. | D.C. | D.C. |
|  |  | T | . | . | . | . |
| 0001 | 4 | R | OFF | 2T | . | SELECTED |
|  |  | T | . | 2R | . | SELECTED |
| D.C. | 5 | R | D.C. | D.C. | D.C. | D.C. |
|  |  | T | . | . | . | . |
| D.C. | 6 | R | D.C. | D.C. | D.C. | D.C. |
|  |  | T | . | . | . | . |
| D.C. | 7 | R | D.C. | D.C. | D.C. | D.C. |
|  |  | T | . | . | . | . |
| D.C. | 8 | R | D.C. | D.C. | D.C. | D.C. |
|  |  | T | . | . | . | . |

(b) OXC APPARATUS 400

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | ST | SELECTED |
|  |  | T | . | 2R | SR | SELECTED |
| 0001 | 2 | R | NORMAL | 1T | . | SELECTED |
|  |  | T | . | 1R | . | SELECTED |
| D.C. | 3 | R | D.C. | D.C. | D.C. | D.C. |
|  |  | T | . | . | . | . |
| D.C. | 4 | R | D.C. | D.C. | D.C. | D.C. |
|  |  | T | . | . | . | . |
| 0001 | 5 | R | OFF | 1T | . | NONSELECTED |
|  |  | T | . | 1R | . | NONSELECTED |
| D.C. | 6 | R | D.C. | D.C. | D.C. | D.C. |
|  |  | T | . | . | . | . |
| D.C. | 7 | R | D.C. | D.C. | D.C. | D.C. |
|  |  | T | . | . | . | . |
| D.C. | 8 | R | D.C. | D.C. | D.C. | D.C. |
|  |  | T | . | . | . | . |

(2) MAIN PASH SELECTED (OXC APPARATUS 100=MAIN PATH SELECTED, OXC APPARATUS 400=MAIN PATH SELECTED) ; MAIN PATH FAULTY (a) OXC APPARATUS 300

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | . | . | . | . |
| 0001 | 2 | R | OFF | ST | . | SELECTED |
|  |  | T | . | SR | . | SELECTED |
| D.C. | 3 | R | D.C. | D.C. | D.C. | D.C. |
|  |  | T | . | . | . | . |
| 0001 | 4 | R | OFF | 2T | . | SELECTED |
|  |  | T | . | 2R | . | SELECTED |
| D.C. | 5 | R | D.C. | D.C. | D.C. | D.C. |
|  |  | T | . | . | . | . |
| D.C. | 6 | R | D.C. | D.C. | D.C. | D.C. |
|  |  | T | . | . | . | . |
| D.C. | 7 | R | D.C. | D.C. | D.C. | D.C. |
|  |  | T | . | . | . | . |
| D.C. | 8 | R | D.C. | D.C. | D.C. | D.C. |
|  |  | T | . | . | . | . |

(b) OXC APPARATUS 400

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | ST | SELECTED |
|  |  | T | . | 2R | SR | SELECTED |
| 0001 | 2 | R | OFF | 1T | . | SELECTED |
|  |  | T | . | 1R | . | SELECTED |
| D.C. | 3 | R | D.C. | D.C. | D.C. | D.C. |
|  |  | T | . | . | . | . |
| D.C. | 4 | R | D.C. | D.C. | D.C. | D.C. |
|  |  | T | . | . | . | . |
| 0001 | 5 | R | OFF | 1T | . | NONSELECTED |
|  |  | T | . | 1R | . | NONSELECTED |
| D.C. | 6 | R | D.C. | D.C. | D.C. | D.C. |
|  |  | T | . | . | . | . |
| D.C. | 7 | R | D.C. | D.C. | D.C. | D.C. |
|  |  | T | . | . | . | . |
| D.C. | 8 | R | D.C. | D.C. | D.C. | D.C. |
|  |  | T | . | . | . | . |

FIG. 14

(3) SWITCHING-IN-PROGRESS STATE (OXC APPARATUS 100=MAIN PATH SELECTED, OXC APPARATUS 400=AUXILIARY PATH SELECTED)

(a) OXC APPARATUS 100

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
|  |  | T |  | 2R | 5R | SELECTED |
| 0001 | 2 | R | OFF | 1T | . | SELECTED |
|  |  | T |  | 1R | . | SELECTED |
| D.C. | 3 | R | D.C. | D.C. | D.C. | D.C. |
|  |  | T | . | D.C. | D.C. | D.C. |
| D.C. | 4 | R | D.C. | D.C. | D.C. | D.C. |
|  |  | T | . | D.C. | D.C. | D.C. |
| 0001 | 5 | R | NORMAL | 1T | . | NONSELECTED |
|  |  | T |  | 1R | . | NONSELECTED |
| D.C. | 6 | R | D.C. | D.C. | D.C. | D.C. |
|  |  | T | . | D.C. | D.C. | D.C. |
| D.C. | 7 | R | D.C. | D.C. | D.C. | D.C. |
|  |  | T | . | D.C. | D.C. | D.C. |
| D.C. | 8 | R | D.C. | D.C. | D.C. | D.C. |
|  |  | T | . | D.C. | D.C. | D.C. |

(b) OXC APPARATUS 200

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | . | D.C. | D.C. | D.C. |
| 0001 | 2 | R | OFF | 5T | . | SELECTED |
|  |  | T |  | 5R | . | SELECTED |
| D.C. | 3 | R | D.C. | D.C. | D.C. | D.C. |
|  |  | T | . | D.C. | D.C. | D.C. |
| D.C. | 4 | R | D.C. | D.C. | D.C. | D.C. |
|  |  | T | . | D.C. | D.C. | D.C. |
| 0001 | 5 | R | OFF | 2T | . | SELECTED |
|  |  | T |  | 2R | . | SELECTED |
| D.C. | 6 | R | D.C. | D.C. | D.C. | D.C. |
|  |  | T | . | D.C. | D.C. | D.C. |
| D.C. | 7 | R | D.C. | D.C. | D.C. | D.C. |
|  |  | T | . | D.C. | D.C. | D.C. |
| D.C. | 8 | R | D.C. | D.C. | D.C. | D.C. |
|  |  | T | . | D.C. | D.C. | D.C. |

(4) SWITCHING COMPLELED AND AUXILIARY PATH SELECTED (OXC APPARATUS 100= MAIN PATH SELECTED, OXC APPARATUS 400=AUXILIARY PATH SELECTED)

(a) OXC APPARATUS 100

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
|  |  | T |  | 2R | 5R | SELECTED |
| 0001 | 2 | R | OFF | 1T | . | NONSELECTED |
|  |  | T |  | 1R | . | NONSELECTED |
| D.C. | 3 | R | D.C. | D.C. | D.C. | D.C. |
|  |  | T | . | D.C. | D.C. | D.C. |
| D.C. | 4 | R | D.C. | D.C. | D.C. | D.C. |
|  |  | T | . | D.C. | D.C. | D.C. |
| 0001 | 5 | R | NORMAL | 1T | . | SELECTED |
|  |  | T |  | 1R | . | SELECTED |
| D.C. | 6 | R | D.C. | D.C. | D.C. | D.C. |
|  |  | T | . | D.C. | D.C. | D.C. |
| D.C. | 7 | R | D.C. | D.C. | D.C. | D.C. |
|  |  | T | . | D.C. | D.C. | D.C. |
| D.C. | 8 | R | D.C. | D.C. | D.C. | D.C. |
|  |  | T | . | D.C. | D.C. | D.C. |

(b) OXC APPARATUS 200

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
|  |  | T | . | D.C. | D.C. | D.C. |
| 0001 | 2 | R | OFF | 5T | . | SELECTED |
|  |  | T |  | 5R | . | SELECTED |
| D.C. | 3 | R | D.C. | D.C. | D.C. | D.C. |
|  |  | T | . | D.C. | D.C. | D.C. |
| D.C. | 4 | R | D.C. | D.C. | D.C. | D.C. |
|  |  | T | . | D.C. | D.C. | D.C. |
| 0001 | 5 | R | OFF | 2T | . | SELECTED |
|  |  | T |  | 2R | . | SELECTED |
| D.C. | 6 | R | D.C. | D.C. | D.C. | D.C. |
|  |  | T | . | D.C. | D.C. | D.C. |
| D.C. | 7 | R | D.C. | D.C. | D.C. | D.C. |
|  |  | T | . | D.C. | D.C. | D.C. |
| D.C. | 8 | R | D.C. | D.C. | D.C. | D.C. |
|  |  | T | . | D.C. | D.C. | D.C. |

FIG. 15

(3) SWITCHING-IN-PROGRESS STATE (OXC APPARATUS 100=MAIN PATH SELECTED, OXC APPARATUS 400=AUXILIARY PATH SELECTED)

(a) OXC APPARATUS 300

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
| D.C. |   | T | D.C. | D.C. | D.C. | D.C. |
| 0001 | 2 | R | OFF | 5T | . | SELECTED |
| 0001 |   | T | . | 5R | . | SELECTED |
| D.C. | 3 | R | D.C. | D.C. | D.C. | D.C. |
| D.C. |   | T | D.C. | D.C. | D.C. | D.C. |
| D.C. | 4 | R | D.C. | D.C. | D.C. | D.C. |
| D.C. |   | T | D.C. | D.C. | D.C. | D.C. |
| 0001 | 5 | R | NORMAL | 2T | . | SELECTED |
| 0001 |   | T | . | 2R | . | SELECTED |
| D.C. | 6 | R | D.C. | D.C. | D.C. | D.C. |
| D.C. |   | T | D.C. | D.C. | D.C. | D.C. |
| D.C. | 7 | R | D.C. | D.C. | D.C. | D.C. |
| D.C. |   | T | D.C. | D.C. | D.C. | D.C. |
| D.C. | 8 | R | D.C. | D.C. | D.C. | D.C. |
| D.C. |   | T | D.C. | D.C. | D.C. | D.C. |

(b) OXC APPARATUS 400

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
| 0001 |   | T | . | 2R | 5R | SELECTED |
| 0001 | 2 | R | OFF | 1T | . | NONSELECTED |
| 0001 |   | T | . | 1R | . | NONSELECTED |
| D.C. | 3 | R | D.C. | D.C. | D.C. | D.C. |
| D.C. |   | T | D.C. | D.C. | D.C. | D.C. |
| D.C. | 4 | R | D.C. | D.C. | D.C. | D.C. |
| D.C. |   | T | D.C. | D.C. | D.C. | D.C. |
| 0001 | 5 | R | OFF | 1T | . | SELECTED |
| 0001 |   | T | . | 1R | . | SELECTED |
| D.C. | 6 | R | D.C. | D.C. | D.C. | D.C. |
| D.C. |   | T | D.C. | D.C. | D.C. | D.C. |
| D.C. | 7 | R | D.C. | D.C. | D.C. | D.C. |
| D.C. |   | T | D.C. | D.C. | D.C. | D.C. |
| D.C. | 8 | R | D.C. | D.C. | D.C. | D.C. |
| D.C. |   | T | D.C. | D.C. | D.C. | D.C. |

(4) SWITCHING COMPLETED AND AUXILIARY PATH SELECTED (OXC APPARATUS 100=MAIN PATH SELECTED, OXC APPARATUS 400=AUXILIARY PATH SELECTED)

(a) OXC APPARATUS 300

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| D.C. | 1 | R | D.C. | D.C. | D.C. | D.C. |
| D.C. |   | T | D.C. | D.C. | D.C. | D.C. |
| 0001 | 2 | R | NORMAL | 5T | . | SELECTED |
| 0001 |   | T | . | 5R | . | SELECTED |
| D.C. | 3 | R | D.C. | D.C. | D.C. | D.C. |
| D.C. |   | T | D.C. | D.C. | D.C. | D.C. |
| D.C. | 4 | R | D.C. | D.C. | D.C. | D.C. |
| D.C. |   | T | D.C. | D.C. | D.C. | D.C. |
| 0001 | 5 | R | NORMAL | 2T | . | SELECTED |
| 0001 |   | T | . | 2R | . | SELECTED |
| D.C. | 6 | R | D.C. | D.C. | D.C. | D.C. |
| D.C. |   | T | D.C. | D.C. | D.C. | D.C. |
| D.C. | 7 | R | D.C. | D.C. | D.C. | D.C. |
| D.C. |   | T | D.C. | D.C. | D.C. | D.C. |
| D.C. | 8 | R | D.C. | D.C. | D.C. | D.C. |
| D.C. |   | T | D.C. | D.C. | D.C. | D.C. |

(b) OXC APPARATUS 400

| PATH INDEX | PORT NUMBER | DIRECTION | LOCAL PORT FAULT STATUS | MAIN XC | AUXILIARY XC | LOCAL PORT SELECTION STATUS |
|---|---|---|---|---|---|---|
| 0001 | 1 | R | NORMAL | 2T | 5T | SELECTED |
| 0001 |   | T | . | 2R | 5R | SELECTED |
| 0001 | 2 | R | OFF | 1T | . | NONSELECTED |
| 0001 |   | T | . | 1R | . | NONSELECTED |
| D.C. | 3 | R | D.C. | D.C. | D.C. | D.C. |
| D.C. |   | T | D.C. | D.C. | D.C. | D.C. |
| D.C. | 4 | R | D.C. | D.C. | D.C. | D.C. |
| D.C. |   | T | D.C. | D.C. | D.C. | D.C. |
| 0001 | 5 | R | NORMAL | 1T | . | SELECTED |
| 0001 |   | T | . | 1R | . | SELECTED |
| D.C. | 6 | R | D.C. | D.C. | D.C. | D.C. |
| D.C. |   | T | D.C. | D.C. | D.C. | D.C. |
| D.C. | 7 | R | D.C. | D.C. | D.C. | D.C. |
| D.C. |   | T | D.C. | D.C. | D.C. | D.C. |
| D.C. | 8 | R | D.C. | D.C. | D.C. | D.C. |
| D.C. |   | T | D.C. | D.C. | D.C. | D.C. |

OPTICAL CROSS CONNECT APPARATUS AND OPTICAL TRANSMISSION SYSTEM

CLAIM OF PRIORITY

The present application claims priority from Japanese patent application serial no. 2004-211504, filed on Jul. 20, 2004, the content of which is hereby incorporated by reference into this application.

BACKGROUND OF THE INVENTION

1. Field of the Invention

The present invention relates to an optical cross connect apparatus and an optical transmission system based on an optical cross connect apparatus, and more particularly to an optical cross connect apparatus that is capable of changing an optical level path and an optical transmission system based on such an optical cross connect apparatus.

2. Description of Related Art

In recent years, there is a demand for an increase in the transmission network speed and capacity due to rapidly increased data traffic. To provide an increase in the transmission network speed and capacity, an optical transmission apparatus (WDM apparatus) is employed for a network. The optical transmission apparatus (WDM apparatus) subjects an optical signal to wavelength division multiplexing (hereinafter referred to as WDM). In WDM, a 10-Gbps high-speed optical signal is subjected to wavelength multiplexing so that an optical signal can be transmitted over a maximum distance of 80 km. Path switching for a 10-Gbps high-speed signal cannot be accomplished with an electrical signal. Such path switching must be performed after serial/parallel conversion is effected to reduce the speed to approximately 150 Mbps. When, on the other hand, a 10-Gbps high-speed optical signal is used, switching takes approximately 1 ms, but switching can be effected without having to reduce the signaling speed. Further, the use of a 10-Gbps high-speed optical signal for switching is at an advantage in that various signal formats can be handled.

The optical cross connect apparatus (hereinafter referred to as the OXC apparatus) is connected to a WDM net, which is formed by the aforementioned WDM apparatus, to perform path switching during the use of an optical signal. In general, the OXC apparatus is not only connected to a WDM net but also connected to a client apparatus, which is a large-scale router or digital cross connect apparatus. A transmission path block between two OXC apparatuses that establish communication between two client apparatuses is referred to as a path. This path may include a third OXC apparatus. The third OXC apparatus simply allows an optical signal to pass as viewed from the aforementioned client apparatuses. It seems that the connections of optical switches in the OXC apparatuses are fixed. However, a path may be formed between the third OXC apparatus and a fourth OXC apparatus. A transmission block between the OXC apparatuses is referred to as a span.

When switching is effected with an electrical signal and without using an OXC apparatus, a transmission apparatus corresponding to the aforementioned third OXC apparatus often connects a low-speed electrical signal, which corresponds to a passing optical signal, directly between transmission apparatuses. In such an instance, the employed network has lost flexibility.

To provide communication redundancy between client apparatuses, a scheme for setting an auxiliary path between the client apparatuses is considered. However, optical level path switching is not defined by the ITU-T or IETF, which is a standardization organization. Under the present circumstances, therefore, OXC apparatuses that are manufactured by different makers in compliance with different specifications cannot be connected face-to-face.

When the SDH/SONET or other protocol based on a telephone line is used, line switching can be quickly performed with a control channel that is superposed over a main signal. A line switching system disclosed by Japanese Laid-Open Publication No. 2004-104186 is for use in a system for establishing communication by using a protocol having no line switching function. This line switching system causes a line switching apparatus to perform line switching when a fault in the main system is detected, transmit a switching request signal to an opposing line switching apparatus, and ensure that the same line is selected. Japanese Laid-Open Publication No. 2004-104186 assumes that a transmission apparatus to which a terminal is connected and a transmission apparatus to which a network is connected are defined in a fixed manner. Further, line switching performed by a line switching apparatus is based on an electrical signal. No optical switch is described in Japanese Laid-Open Publication No. 2004-104186.

An optical cross connect apparatus disclosed by Japanese Laid-Open Publication No. 2003-115798 uses an optical coupler to divide an optical signal into two branches and monitors for a fault in an auxiliary transmission path. However, Japanese Laid-Open Publication No. 2003-115798 does not describe an optical signal loss that is caused by branching.

"Optical Cross Connect Technology for All-Optical Network", sheets 15, 19 and 22, which is written by Shoichiro Seno, describes the aforementioned background technology and an optical path protection technology based on a bridge and a selector.

Optical level path switching is neither defined by the ITU-T or IETF, which is a standardization organization, nor otherwise defined as a standard. Under the present circumstances, therefore, OXC apparatuses manufactured in compliance with different specifications cannot be connected face-to-face so that adequate interoperability is not provided. In a network in which no OXC apparatus is used, it is necessary to perform switching after high-speed signals are converted to low-speed signals, and network flexibility is not adequately provided.

SUMMARY OF THE INVENTION

The present invention makes it possible to provide interoperability and contribute to promoting the use of a wavelength-multiplexed net.

The above object is achieved by providing an optical cross connect apparatus that includes an optical switch for generating plural optical output signals from plural optical input signals; an optical level monitor section for detecting optical levels of optical input signals; a path switching management section for connecting the optical switch to the optical level monitor section and recording a path switching management table; and a control section for referencing the path switching management table when the optical input signal detected by the optical level monitor section is found to be OFF and judging whether the optical switch should be operated.

BRIEF DESCRIPTION OF THE DRAWINGS

Preferred embodiments of the present invention will now be described in conjunction with the accompanying drawings, in which:

FIGS. 5A, 5B, 5C and 5D are a sequence diagram illustrating path switching operations according to one embodiment of the present invention;

FIGS. 9A and 9B illustrate operations that are performed by an end office node OXC apparatus according to one embodiment of the present invention when switching is completed;

FIG. 10 is a switching state transition table that illustrates transition destinations according to one embodiment of the present invention;

FIG. 11 is a state transition diagram according to one embodiment of the present invention;

FIG. 12 shows OXC apparatus path switching management tables according to one embodiment of the present invention;

FIG. 13 shows OXC apparatus path switching management tables according to one embodiment of the present invention;

FIG. 14 shows OXC apparatus path switching management tables according to one embodiment of the present invention;

FIG. 15 shows OXC apparatus path switching management tables according to one embodiment of the present invention.

DESCRIPTION OF THE PREFERRED EMBODIMENTS

Figure 1:
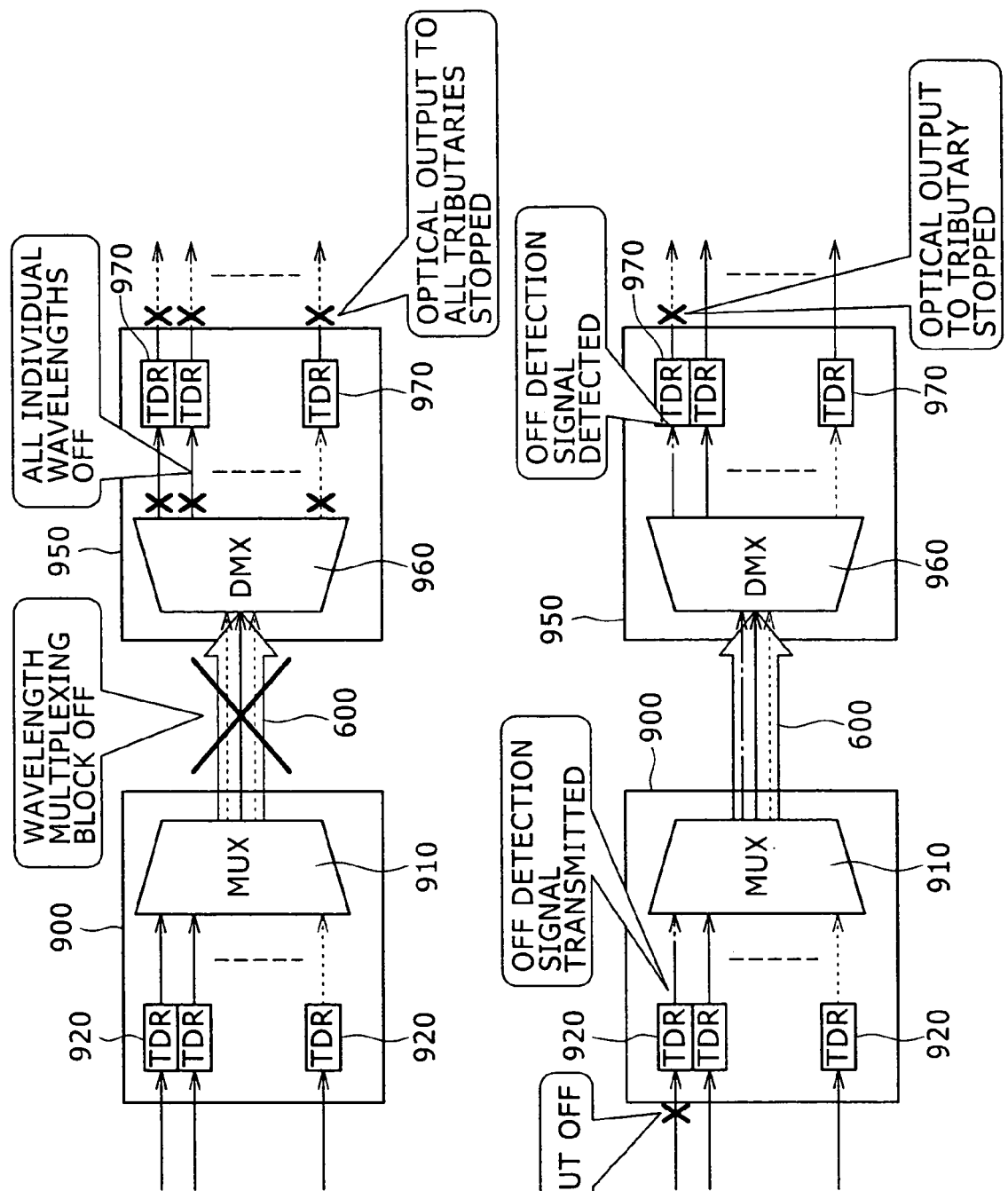
FIGS. 1A and 1B illustrate WDM net fault propagation.
Figure 2:
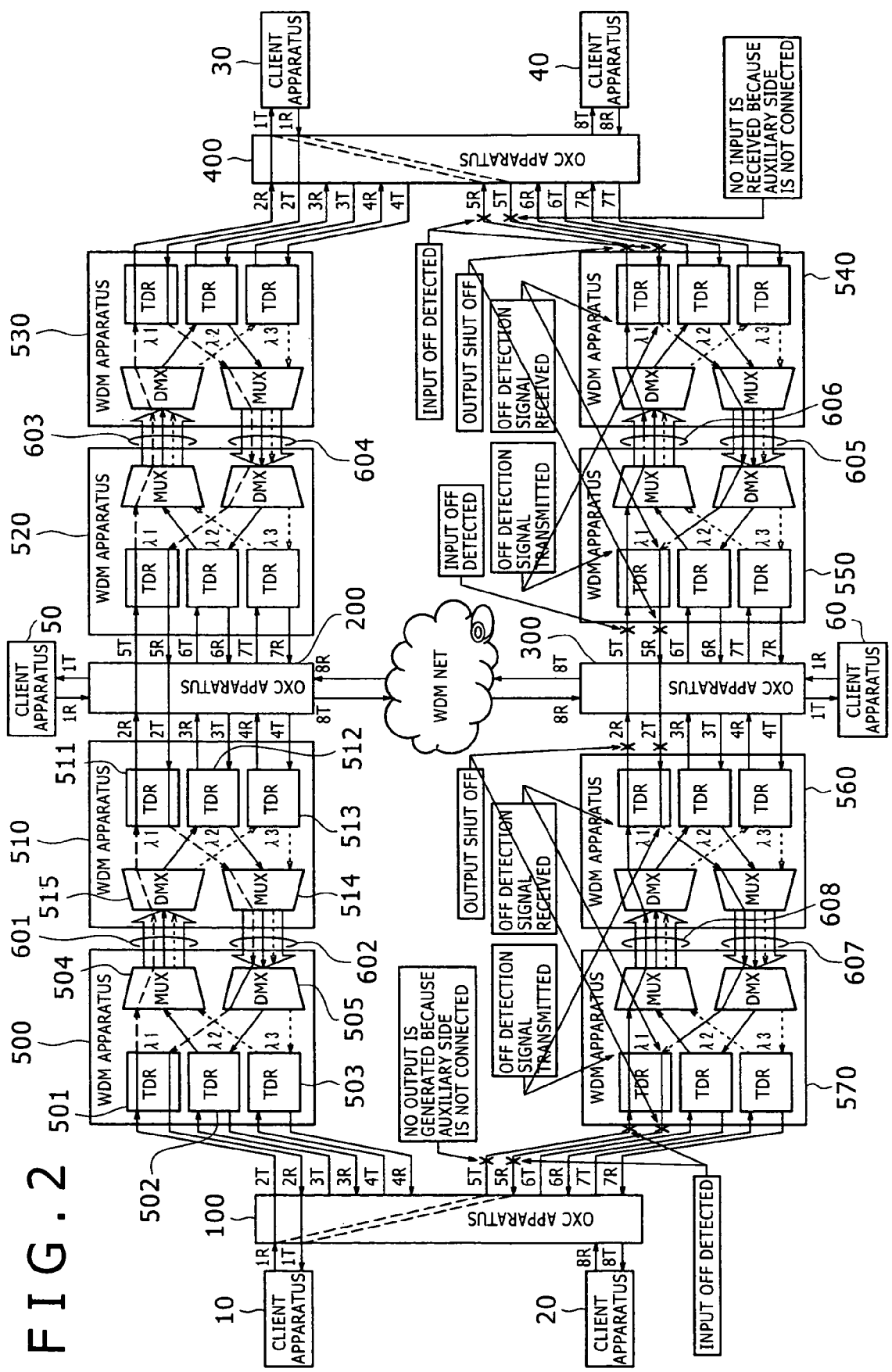
FIG. 2 is a block diagram illustrating the normal state of an optical network according to one embodiment of the present invention.
Figure 3:
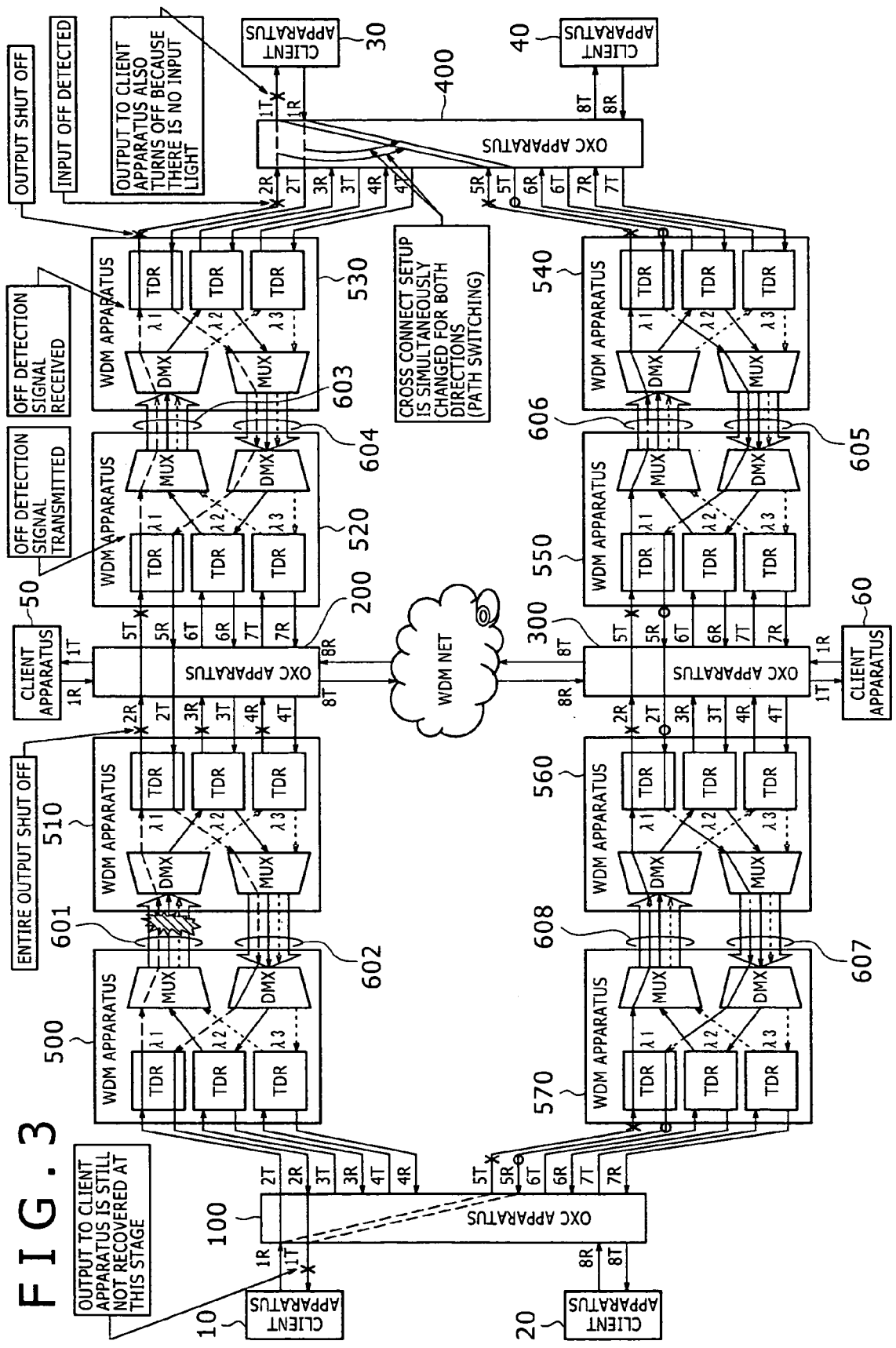
FIG. 3 is a block diagram illustrating the fault detection state of an optical network according to one embodiment of the present invention.
Figure 4:
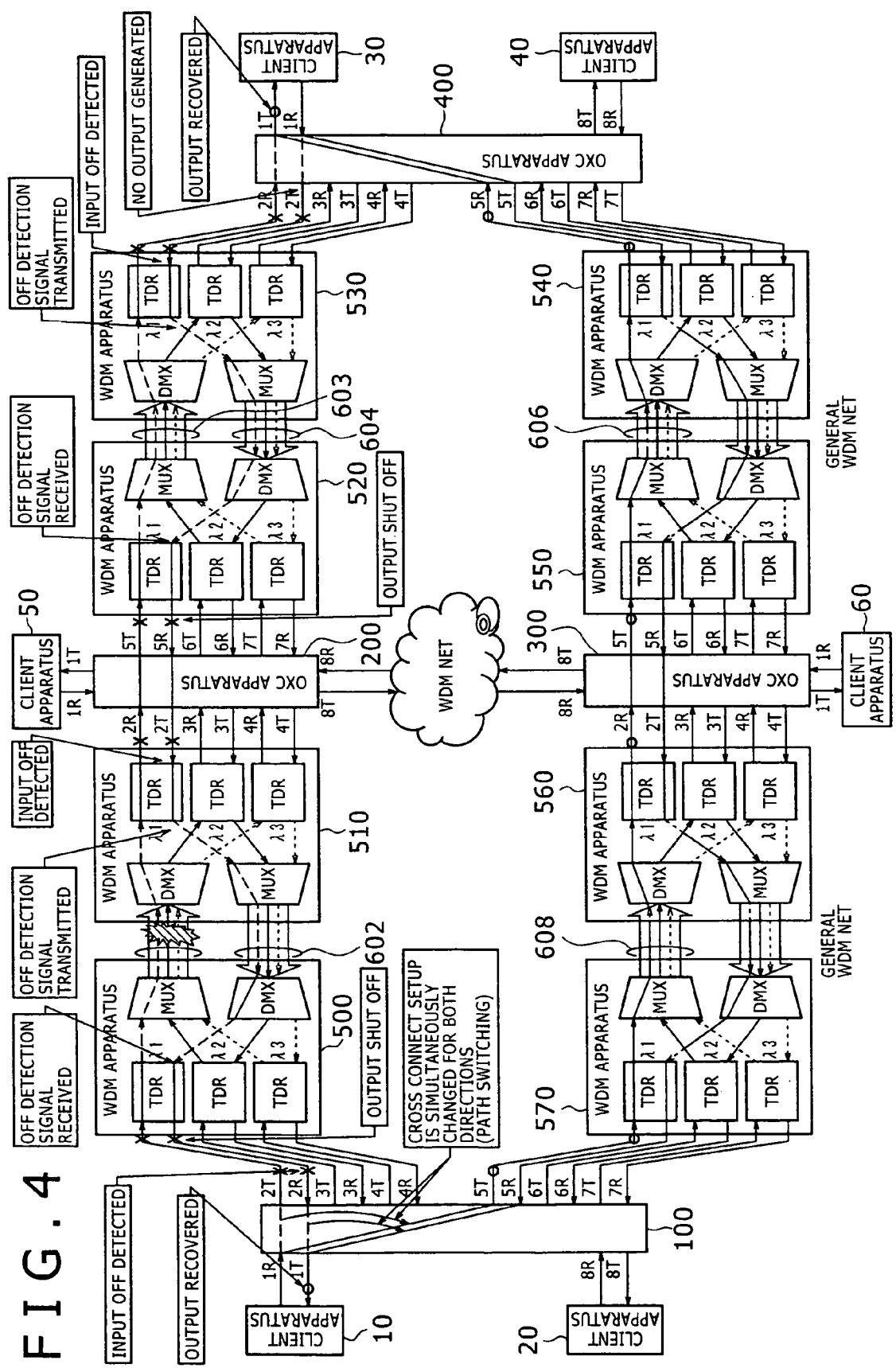
FIG. 4 is a block diagram illustrating the path switching completion state of an optical network according to one embodiment of the present invention.
Figure 6A:
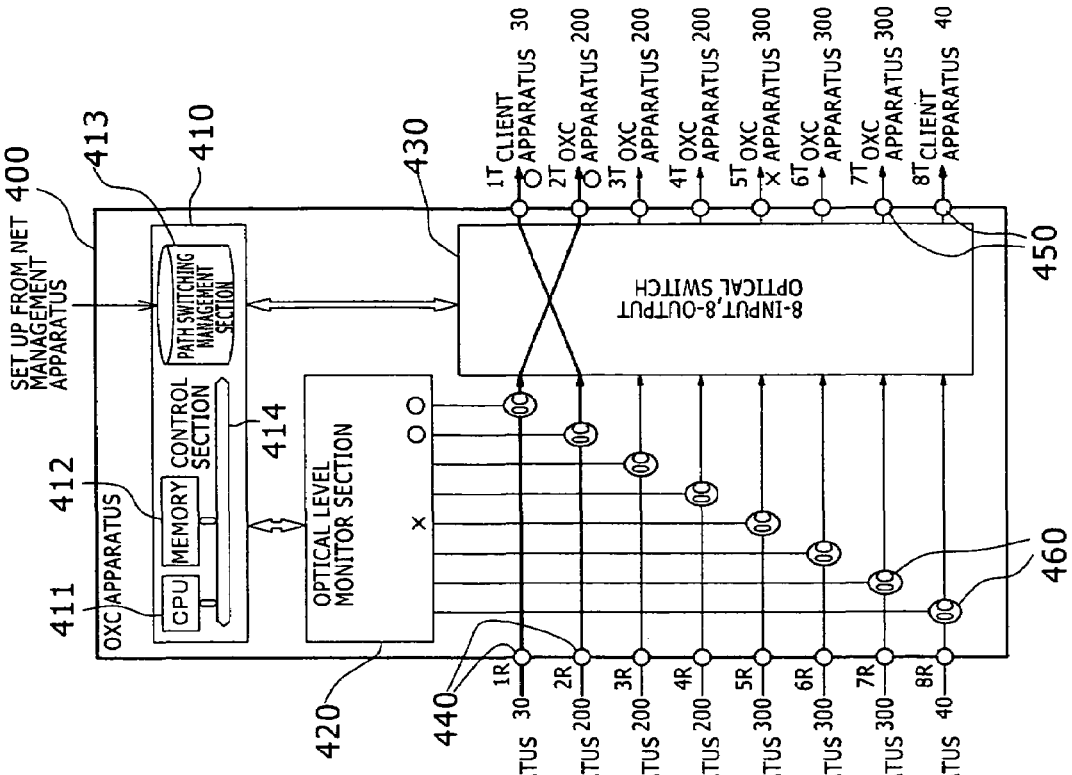
FIGS. 6A and 6B illustrate operations that are performed by an end office node OXC apparatus according to one embodiment of the present invention during a normal state.
Figure 6B:
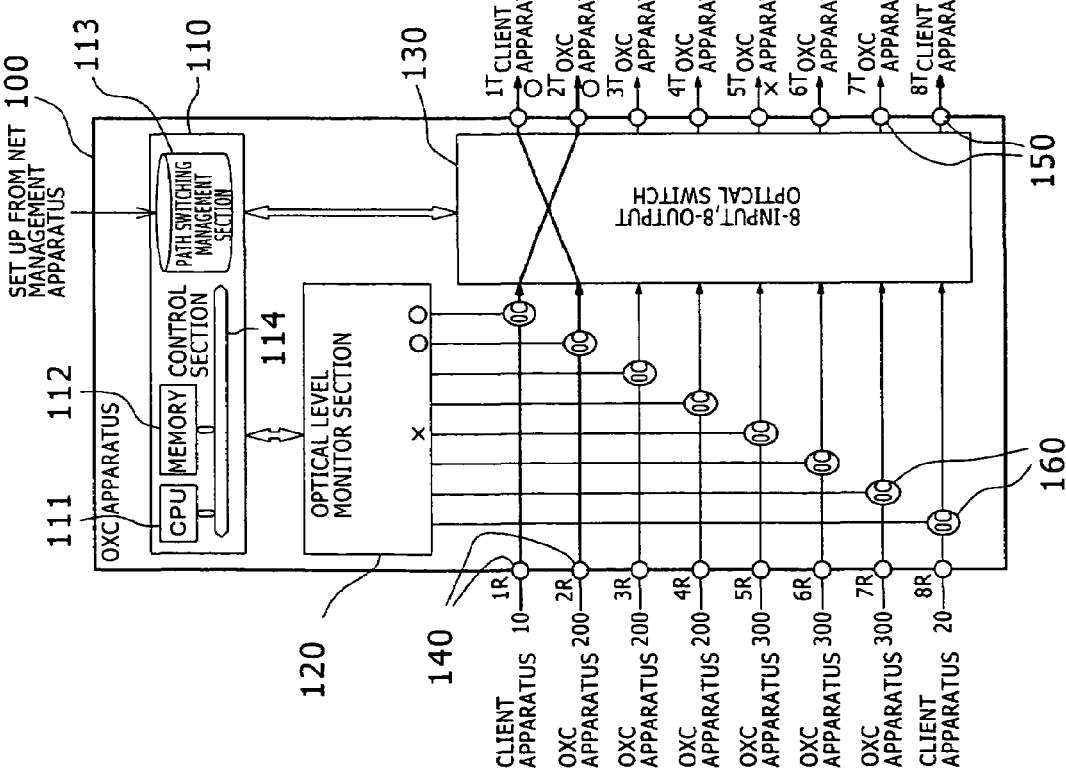
Figure 7A:
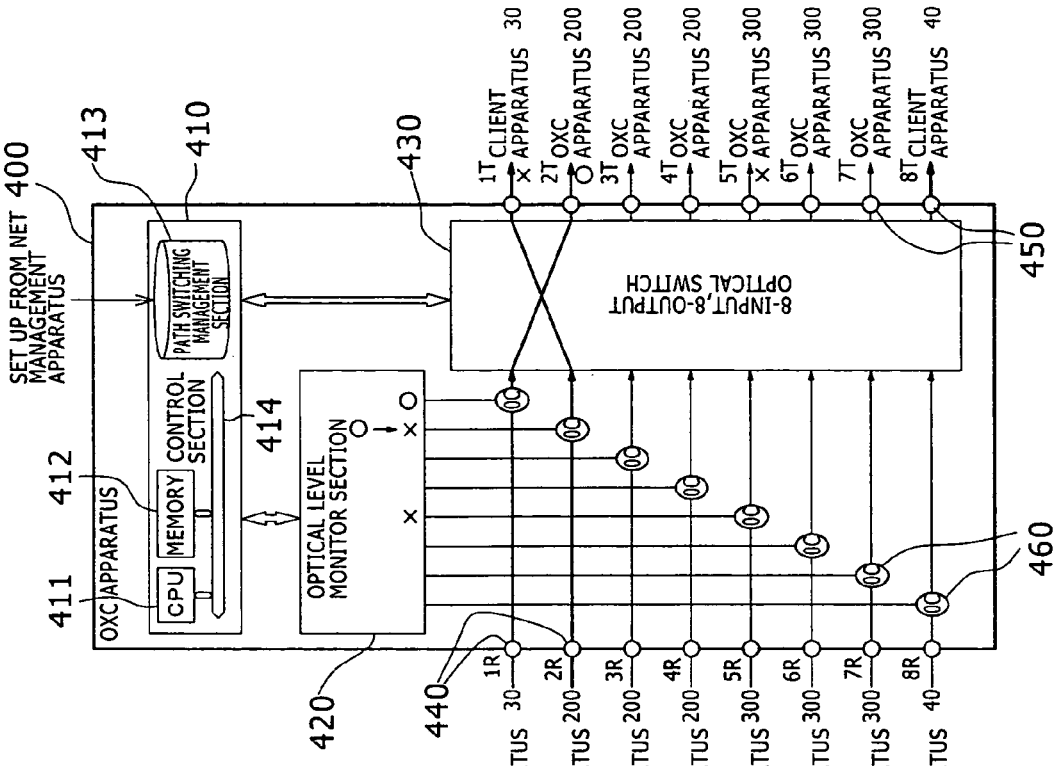
FIGS. 7A and 7B illustrate operations that are performed by an end office node OXC apparatus according to one embodiment of the present invention when a fault occurs.
Figure 7B:
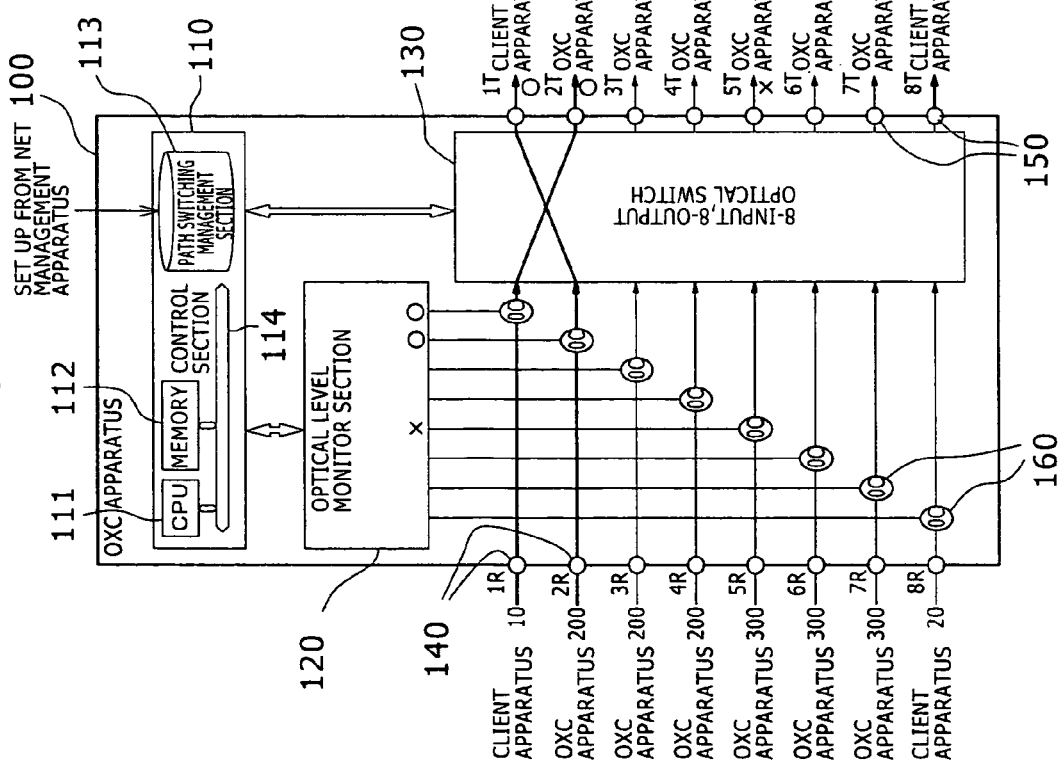
Figure 8B:
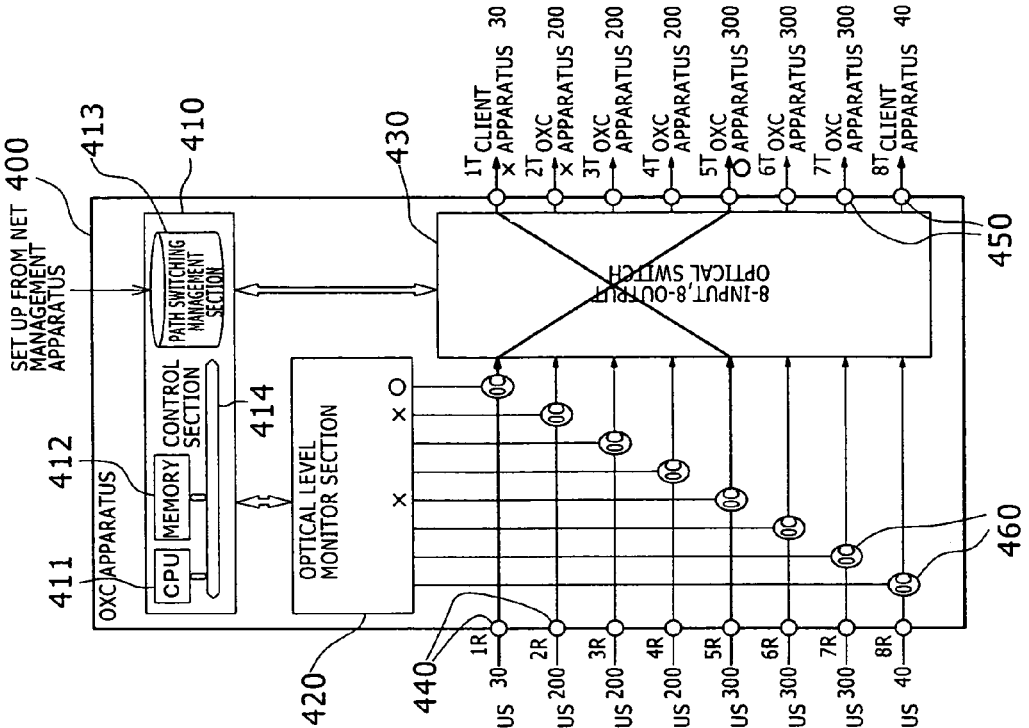
FIGS. 8A and 8B illustrate operations that are performed by an end office node OXC apparatus according to one embodiment of the present invention while switching is in progress.
Figure 8A:
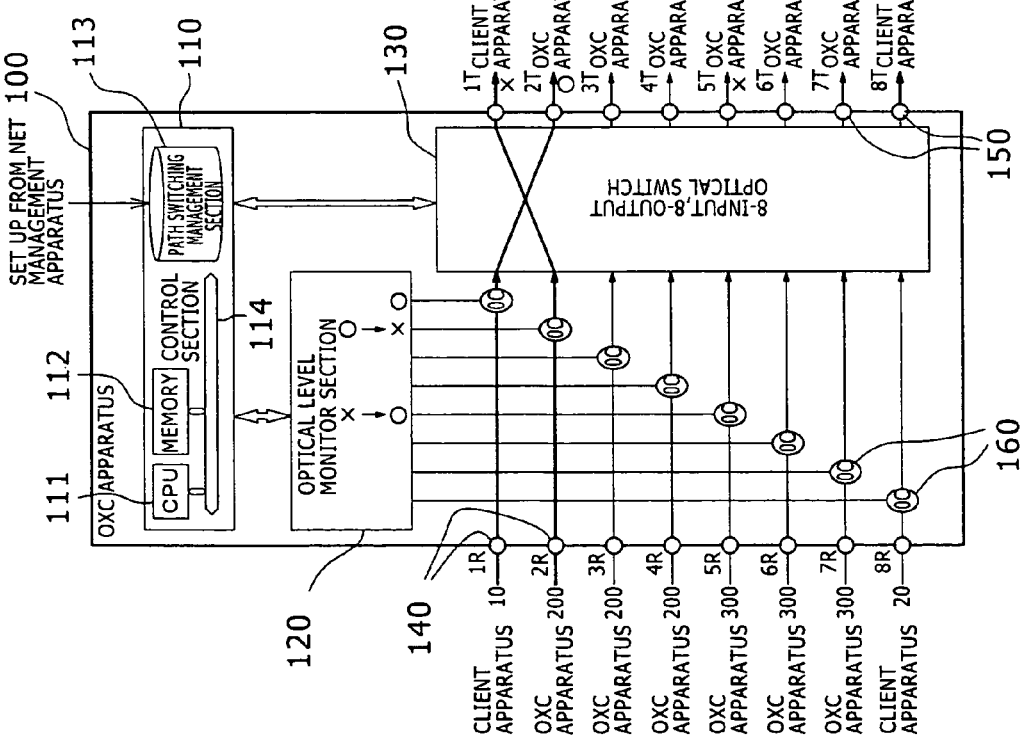
Figure 16:
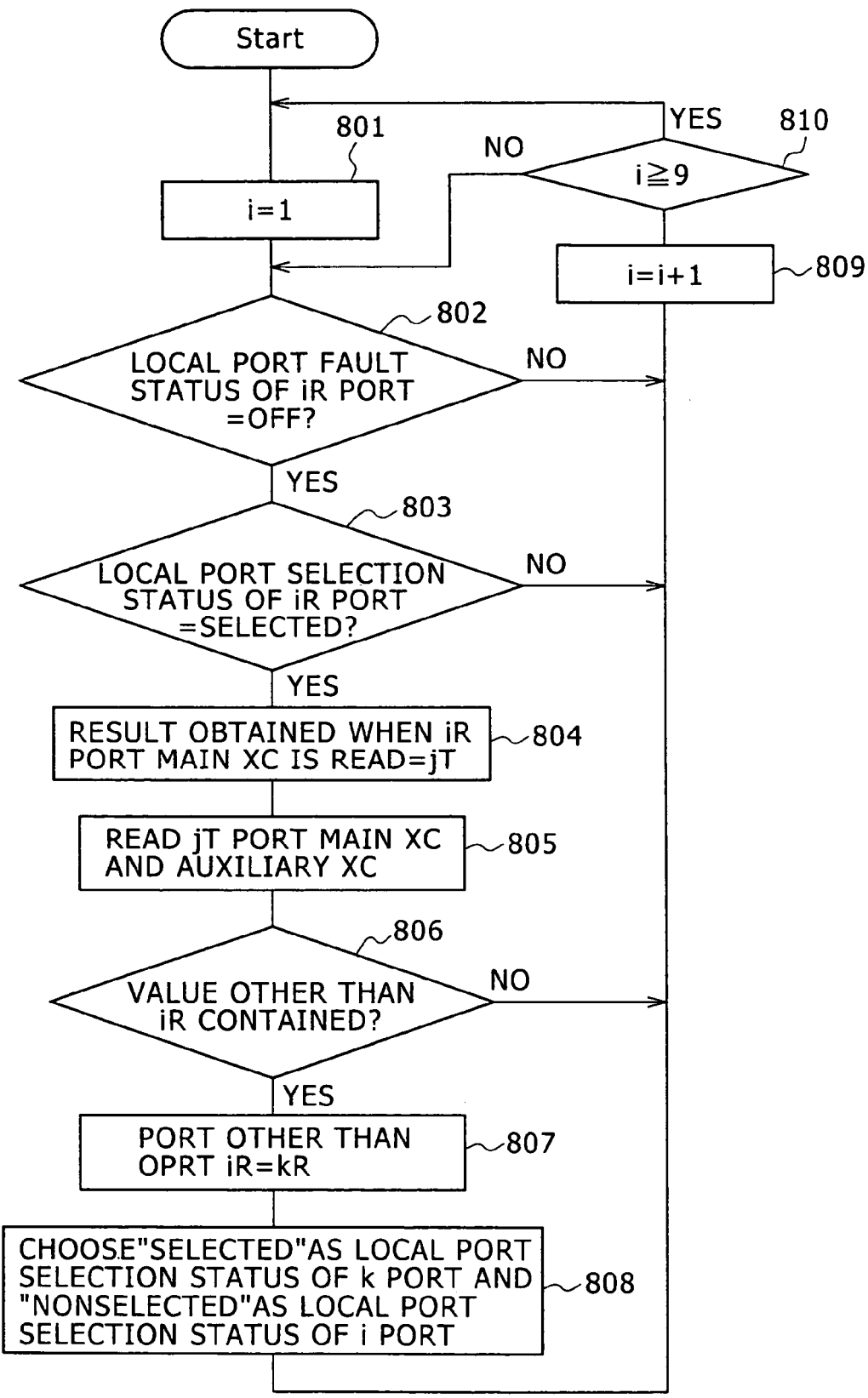
FIG. 16 is a flowchart illustrating how an OXC apparatus path switching management table according to one embodiment of the present invention is rewritten.

Embodiments of the present invention will now be described with reference to the accompanying drawings. FIGS. 1A and 1B illustrate the configuration of a WDM net and fault propagation. FIG. 2 is a block diagram illustrating the normal state of an optical network according to one embodiment of the present invention. FIG. 3 is a block diagram illustrating the fault detection state of an optical network according to one embodiment of the present invention. FIG. 4 is a block diagram illustrating the path switching completion state of an optical network according to one embodiment of the present invention. FIG. 5 is a sequence diagram illustrating path switching operations according to one embodiment of the present invention. FIGS. 6A and 6B illustrate operations that are performed by an end office node OXC apparatus according to one embodiment of the present invention during a normal state. FIGS. 7A and 7B illustrate operations that are performed by an end office node OXC apparatus according to one embodiment of the present invention when a fault occurs. FIGS. 8A and 8B illustrate operations that are performed by an end office node OXC apparatus according to one embodiment of the present invention while switching is in progress. FIGS. 9A and 9B illustrate operations that are performed by an end office node OXC apparatus according to one embodiment of the present invention when switching is completed. FIG. 10 is a switching state transition table that illustrates transition destinations according to one embodiment of the present invention. FIG. 11 is state transition diagram according to one embodiment of the present invention. FIGS. 12 to 15 show OXC apparatus path switching management tables according to one embodiment of the present invention. FIG. 16 is a flowchart illustrating how an OXC apparatus path switching management table according to one embodiment of the present invention is rewritten.

Referring to FIGS. 1A and 1B, an optical signal transmitted from a tributary is received by a transmission transponder 920 in a transmission WDM apparatus 900. The transmission transponder 920 adds OTN (Optical Transport Network) management information, which is valid in a wavelength multiplexing block, to the optical signal, and effects conversion to obtain a wavelength that is managed in nanometer order for wavelength multiplexing purposes. A total of sixteen transponders 920 differ in transmission wavelength. A wavelength multiplexer 910 multiplexes sixteen wavelengths and transmits the results to a transmission path 600.

A wavelength-multiplexed signal, which is transmitted from the transmission path 600, is separated into sixteen waves by a wavelength demultiplexer 960 in a reception WDM apparatus 950. The resultant wavelength-demultiplexed optical signal is received by a reception transponder 970. The reception transponder 970 terminates the OTN management information, monitors the status of the wavelength multiplexing block, effects conversion to recover the original format, and transmits the result to the tributary side.

FIG. 1A illustrates a situation where a fault is encountered in the transmission path 600, which is a wavelength multiplexing block. A fault in the transmission path 600 is a wavelength-multiplexed signal fault.

Wavelength-demultiplexed optical signals are all OFF. By de facto standard, the reception transponder 970 stops its output when the wavelength-demultiplexed optical signal is OFF. The signals are OFF at locations that are marked "x". When a fault occurs between the transmission transponder 920 and wavelength multiplexer 910, it is merely handled as a one wave fault, and the output of the associated reception transponder 970 turns OFF similarly.

FIG. 1B illustrates a fault in which a tributary input is OFF. When one of sixteen tributary inputs of the transmission WDM apparatus 900 is OFF, the associated transmission transponder 920 detects such an OFF state and transmits an OFF detection signal, which is standardized by the ITU-T, to the wavelength multiplexer 910. The OFF detection signal is received by the associated reception transponder 970 via the transmission path 600 and wavelength demultiplexer 960. Upon receipt of the OFF detection signal, the reception transponder 970 stops the output to the tributary. By de facto standard, the reception transponder stops its output when it receives the OFF detection signal. When a fault occurs between the wavelength demultiplexer 960 and reception transponder 970, the output of the associated reception transponder 970 turns OFF similarly.

As described with reference to FIGS. 1A and 1B, when a fault occurs in a WDM net that includes the transmission WDM apparatus 900 and reception WDM apparatus 950, it is reported to the tributary side as an output OFF state of the associated transponder 970 in the opposing reception WDM apparatus 950.

An embodiment of the present invention will now be described with reference to FIGS. 2 to 16.

First of all, the communication between client apparatuses 10 and 30 will be described with reference to FIG. 2. The main path includes an OXC apparatus 100, a WDM apparatus 500 connected to the OXC apparatus 100, an opposing WDM apparatus 510, an OXC apparatus 200 connected to a WDM apparatus 510, a WDM apparatus 520 connected to the OXC apparatus 200, an opposing WDM apparatus 530, and an OXC apparatus 400 that terminates the path. The auxiliary path includes the OXC apparatus 100, a WDM apparatus 570 connected the OXC apparatus 100, an opposing WDM apparatus 560, an OXC apparatus 300 connected to a WDM apparatus 560, a WDM apparatus 550 connected to an OXC apparatus 300, an opposing WDM apparatus 540, and an OXC apparatus 400 that terminates the path.

Client apparatuses 10 and 20 are connected to the OXC apparatus 100. A client apparatus 50 is connected to OXC apparatus 200. A client apparatus 60 is connected to OXC apparatus 300. Client apparatuses 30 and 40 are connected to OXC apparatus 400. In the present embodiment, however, only the communication between client apparatuses 10 and 30 is considered.

The OXC apparatus 100, which is at one end of the path, uses port 1R to receive a signal from the client apparatus 10. Its internal switch selects a port 2T as an output destination. Further, the internal switch is controlled so that an output port 1T for delivering an output to the client apparatus 10 selects a port 2R of the OXC apparatus 100. Broken lines in the figure indicate internal switch connections that are to be made when the auxiliary path is selected. A port 1R of the OXC apparatus 100 is to be connected a port 5T, and the port 1T is to be connected to a port 5R. Similarly, the OXC apparatus 400, which is at the other end of the path, receives a signal from the client apparatus 30 via the port 1R, and its internal switch selects the port 2T as an output destination. Further, the internal switch is controlled so that the output port 1T for delivering an output to the client apparatus 30 selects the port 2R of the OXC apparatus 400. When the auxiliary path is selected, however, the internal switch connects the port 1R of the OXC apparatus 400 to the port 5T and connects the port 1T to the port 5R.

On the other hand, regarding the OXC apparatuses 200 and 300 arranged in this path, connection is made fixedly.

The WDM apparatus 500 is a bidirectional WDM apparatus, which includes a transponder 501 for wavelength λ1 (lambda 1), a transponder 502 for wavelength λ2, a transponder 503 for wavelength λ3, a wavelength multiplexer 504, and a wavelength demultiplexer 505. Wavelengths λ1 to λ3 are managed in nanometer order for wavelength multiplexing purposes. WDM apparatuses 510 to 570 are not described herein because they have basically the same configuration as the WDM apparatus 500. The WDM apparatuses 500 and 510 are interconnected with optical fibers 601, 602 to form a WDM net. The WDM apparatuses 520 to 570 form WDM nets with opposing WDM apparatuses. Further, a similar WDM net is formed between cross connect the apparatuses 200 and 300.

In the network shown in FIG. 2, the client apparatus 10, client apparatus 20, OXC apparatus 100, WDM apparatus 500, and WDM apparatus 570 are usually positioned at the same site. Similarly, the client apparatus 30, client apparatus 40, OXC apparatus 400, WDM apparatus 530, and WDM apparatus 540 are usually positioned at the same site. Further, the client apparatus 50, OXC apparatus 200, WDM apparatus 510, and WDM apparatus 520 are usually positioned at the same site. Similarly, the client apparatus 60, OXC apparatus 300, WDM apparatus 550, and WDM apparatus 560 are usually positioned at the same sire. The term "site" refers, for instance, to a station building, which includes management areas covered by the same administrator. The maximum site-to-site distance is 80 km in a situation where no optical relay/amplification station is used. When an optical relay/amplification station is used, the maximum site-to-site distance may exceed 1000 km.

Next, the flow of a signal will be described. For the sake of brevity, only the operation performed within the WDM net between the OXC apparatuses 100 and 200 will be explained. However, the same operation is performed within the other WDM nets.

An optical signal from the client apparatus 10 enters the port 1R of the OXC apparatus 100 and is output to the port 2T via the internal switch. The port 2T is connected to a transmission/reception transponder 501 of the WDM apparatus 500. Therefore, the transmission/reception transponder 501 adds OTN management information, which is valid in a transmission path 601 that is a wavelength multiplexing block, to the optical signal, which is then converted to a wavelength λ1. The wavelength multiplexer 504 multiplexes an optical signal that has the wavelength λ1 and is transmitted from the transmission/reception transponder 501, an optical signal that has a wavelength λ2 and is transmitted from the transmission/reception transponder 502, and an optical signal that has a wavelength λ3 and is transmitted from the transmission/reception transponder 503, and transmits the resultant wavelength-multiplexed optical signal to the optical fiber 601.

The wavelength-multiplexed optical signal transmitted from the optical fiber 601 is wavelength-demultiplexed by a wavelength demultiplexer 515 of the WDM apparatus 510, which faces the WDM apparatus 500. The wavelength demultiplexer 515 transmits an optical signal having the wavelength λ1 to a transmission/reception transponder 511, an optical signal having wavelength λ2 to the transmission/reception transponder 512, and an optical signal having the wavelength λ3 to the transmission/reception transponder 513. The transmission/reception transponder 511 receives the optical signal having the wavelength λ1, terminates the OTN management information, monitors the status of the wavelength multiplexing block, and effects wavelength conversion (a series of operations performed by the transmission/reception transponder 511 is referred to as OTN termination). Since the transmitting end of the transmission/reception transponder 511 is connected to the port 2R of the OXC apparatus 200, the optical signal is transmitted to the port 2R of the OXC apparatus 200. The port 2R of the OXC apparatus 200 is connected to port 5T, and the port 5T is connected to the WDM apparatus 520. Therefore, the optical signal is converted again to an optical signal having the wavelength λ1 by the WDM apparatus 520 and then received via an optical fiber 603. The optical signal enters a port of the OXC apparatus 400, which is connected to the WDM apparatus 530. The OXC apparatus 400 selects the port 1T as an output destination for port 2R. The client apparatus 30 is connected to the port 1T. Therefore, the client apparatus 30 receives an optical signal that is transmitted from the client apparatus 10.

Meanwhile, the optical signal transmitted from the client apparatus 30 enters the WDM apparatus 530 via the port 1R of the OXC apparatus 400 and the port 2T. The wavelength of the optical signal is converted to λ1 by the WDM apparatus 530. The converted optical signal is wavelength-multiplexed together with the other optical signals. The resultant wavelength-multiplexed optical signal is received by the opposing WDM apparatus 520 via an optical fiber 604. The optical signal having the wavelength λ1 is subjected to OTN termination by the WDM apparatus 520 and then forwarded to the port 5R of the OXC apparatus 200. For the OXC apparatus 200, the port 2T is selected as an output destination for the port 5R. Therefore, the optical signal is received by the transmission/reception transponder 511 of the WDM apparatus 510, which is connected to the port 2T of the OXC apparatus 200. The transmission/reception transponder 511 adds OTN management information, which is valid in the wavelength multiplexing block, to the optical signal, and effects conversion to the wavelength λ1. A wavelength multiplexer 514 operates so that the optical signal whose wavelength is now converted to λ1 is multiplexed together with the optical signal that has the wavelength λ2 and is transmitted from the transmission/reception transponder 512 and the optical signal that has the wavelength λ3 and is transmitted from the transmission/reception transponder 513. The wavelength-multiplexed optical signal is transmitted to the optical fiber 602.

The wavelength-multiplexed optical signal transmitted from the optical fiber 602 is wavelength-demultiplexed by the wavelength demultiplexer 505 of the WDM apparatus 500, which faces the WDM apparatus 510. The wavelength demultiplexer 505 transmits the optical signal having the wavelength λ1 to the transmission/reception transponder 501, the optical signal having the wavelength λ2 to the transmission/reception transponder 502, and the optical signal having the wavelength λ3 to the transmission/reception transponder 503. The transmission/reception transponder 501 receives the optical signal having the wavelength λ1, terminates the OTN management information, and monitors the status of the wavelength multiplexing block. Since the transmitting end of the transmission/reception transponder 501 is connected to the port 2R of the OXC apparatus 100, the optical signal is transmitted to the port 2R of the OXC apparatus 100. The OXC apparatus selects the port 1T as an output destination for the port 2R. Further, the receiving end of client apparatus 10 is connected to the port 1T. Therefore, the optical signal transmitted by the client apparatus 30 is received by the client apparatus 10.

The status of the auxiliary system, which is not selected, will now be described. The optical signal transmitted from the client apparatus 10 is not transmitted to the port 5T, which is an auxiliary port of the OXC apparatus 100. In other words, the optical signal transmitted from the client apparatus 10 is not bridged. As described with reference to FIGS. 1A and 1B, therefore, the WDM apparatus 570 transmits an OFF detection signal for the wavelength λ1 to an optical fiber 608. The WDM apparatus 560 receives the OFF detection signal for the wavelength λ1 and continuously stops the associated optical signal that is connected to the port 2R of the OXC apparatus 300.

The OXC apparatus 300 detects that the optical signal connected to the port 2R is stopped. However, the connection to the port 2R is fixed. Therefore, the associated optical signal transmission to the WDM apparatus 550 is continuously stopped. An optical fiber 606 transmits an OFF detection signal for the wavelength λ1 similarly between the WDM apparatus 550 and the WDM apparatus 540. However, the WDM apparatus 540 continuously stops the optical signal. The OXC apparatus 400 detects that the optical signal connected to the port 5R is stopped. However, the port 5R is an auxiliary reception port; therefore, no connection change is made.

As regards the auxiliary system, which is oriented in the opposite direction, the OFF detection signal for the wavelength λ1 is transmitted to optical fibers 605 and 607 in exactly the same manner as described above. It goes without saying that no connection change is made for the OXC apparatuses 300 and 100.

In the embodiment described above, the OXC apparatuses 100 and 400, which are at the ends of the path, are referred to as end office nodes. The OXC apparatuses 200 and 300, which are positioned midway within the path, are referred to as relay nodes. The name "main system" is not absolute. Since the main system may be replaced by the auxiliary system, the term "selected system" may be used instead.

A path switching operation will now be described with reference to FIGS. 3 and 4. For explanation purposes, it is assumed that wire breakage has occurred in the optical fiber 601 or optical relay transmission apparatus (not shown) between the WDM apparatuses 500 and 510 when communication is established between the client apparatuses 10 and 30, which are described with reference to FIG. 2. Referring to FIG. 3, the WDM apparatus 510 shuts off the entire optical output as described earlier. The OXC apparatus 200 detects that the input signal for the port 2R to which the optical signal transmitted from the client 10 is connected is OFF. However, no connection change is made. Therefore, the WDM apparatus 520, which is a connection destination for the port 5T and is to be connected to the port 2R, detects that the optical signal transmitted from the client apparatus 10 is OFF. The WDM apparatus 520 transmits an OFF detection signal to WDM apparatus 530, which faces WDM apparatus 520, via the optical fiber 603. The WDM apparatus 530 receives the OFF detection signal and shuts off the associated output to the OXC apparatus 400. The OXC apparatus 400 detects that the signal received by the port 2R is OFF, and turns OFF the output to the client apparatus 30.

When optical signal input OFF in the main system is detected, the OXC apparatus 400 performs cross connect switching from the main system to the auxiliary system on a pair basis for both the receiving end and transmitting end. As a result, the optical signal, which flows within the main system and is transmitted from the client apparatus 30 to the client apparatus 10, turns OFF within the main system, and then flows within the auxiliary system. The second half will be described with reference to FIG. 3.

When a cross connect change is made for the OXC apparatus 400, the optical signal transmitted from the client apparatus 30 is converted to an optical signal having the wavelength λ1 and subjected to wavelength multiplexing in the WDM apparatus 540, which is connected to the port 5T of the OXC apparatus 400. The wavelength-multiplexed optical signal is received by the WDM apparatus 550, which faces the WDM apparatus 540, via the optical fiber 605. The WDM apparatus 550 transmits a wavelength-demultiplexed optical signal to the port 5R of the OXC apparatus 300. The OXC apparatus 300 is a relay node between client the apparatuses 30 and 10, and no cross connect change is made. Therefore, the output is generated as is from the port 2T. The WDM apparatus 560, which is connected, converts the output to an optical signal having the wavelength λ1 and subjects it to wavelength multiplexing. The wavelength-multiplexed optical signal is received by the WDM apparatus 570, which faces the WDM apparatus 560, via the optical fiber 607. The WDM apparatus 570 transmits a wavelength-demultiplexed optical signal to the port 5R of the OXC apparatus 100. At this stage, however, the OXC apparatus 100 selects the ports 2R and 2T of the main system. Therefore, the optical signal is not transmitted to the client apparatus 10.

When optical signal input OFF in the main system is detected, the OXC apparatus 400 performs cross connect switching from the main system to the auxiliary system on a pair basis for both the receiving end and transmitting end. As a result, the optical signal, which flows within the main system and is transmitted from the client apparatus 30 to the client apparatus 10, turns OFF within the main system, and then flows within the auxiliary system. The first half will be described with reference to FIG. 4.

When a cross connect change is made for the OXC apparatus 400, the optical signal transmitted from the client apparatus 30 stops being generated from the port 2T of the OXC apparatus 400. The WDM apparatus 530 judges that such an output stop is due to wire breakage. The WDM apparatus 530 transmits an OFF detection signal to the opposing WDM apparatus 520. The WDM apparatus 520 receives the OFF detection signal and turns OFF its output. The OXC apparatus 200, for which the input is OFF, is a relay node between the client apparatuses 30 and 10 and does not make a cross connect change. Therefore, the optical signal directly stops being generated from the port 2T. Briefly speaking, the optical signal OFF state propagates to the port 2R of the OXC apparatus 100, which is a far end node. When an optical input OFF state is detected, the OXC apparatus 100 turns OFF the signal output to the client apparatus 30.

When optical signal input OFF in the main system is detected, the OXC apparatus 100 performs cross connect switching from the selected system to the auxiliary system on a pair basis for both the receiving end and transmitting end. The OXC apparatus 400 has already performed cross connect switching from the main system to the auxiliary system on a pair basis for both the receiving end and transmitting end. Therefore, when the OXC apparatus 100 performs cross connect switching, path switching is completed in both directions. When bidirectional path switching is completed, the communication between the client apparatuses 10 and 30 is restored to normal.

A path switching operation in the present embodiment will now be described with reference to a sequence diagram shown in FIGS. 5A to 5D.

Referring to FIGS. 5A to 5D, the OXC apparatus 100, which is an end office node, is shown at the leftmost end, and vertical straight lines indicate the ports 1R, 1T, 2R, 2T, 5R, and 5T of the OXC apparatus 100. The OXC apparatus 400, which is an end office node, is shown at the rightmost end, and vertical straight lines indicate the ports 5R, 5T, 2R, 2T, 1R, and 1T of the OXC apparatus 400. The OXC apparatuses 200 and 300 are indicated between the OXC apparatuses 100 and 400. Since the OXC apparatuses 200 and 300 are relay nodes, they do not perform port switching, and are provided with the ports 2R, 2T, 5R, and 5T.

From top to bottom, diagrams in FIG. 5A illustrate normal state, in FIG. 5B illustrate fault occurrence state, in FIG. 5C illustrate switching-in-progress state, and in FIG. 5D illustrate switching completion state. On the receiving side of each OXC apparatus, which is represented by the letter "R", a nought mark is used to indicate that the input light level of a received signal is normal, whereas a cross mark is used to indicate that the input light level of a received signal is abnormal (indicate that the signal is OFF). On the transmitting side of each OXC apparatus, which is represented by the letter "T", a lateral black triangular mark is used to indicate that the signal output is normal with cross connect setup performed, whereas a lateral white triangular mark is used to indicate that the signal is OFF although cross connect setup is performed. If the transmitting side of an OXC apparatus, which is represented by the letter "T", is not provided with a lateral black triangular mark or lateral white triangular mark, it means that the signal is OFF with no cross connect setup performed.

A solid line indicates that there is a signal flow, whereas a broken line indicates that there is no signal flow. A portion enclosed between square brackets is not selected. Although a WDM net exists between nodes, it is not indicated in the figure because it can be regarded as a transmission path. A relay node can also be regarded as a transmission path.

In the normal state, which is shown in diagram (a) of FIG. 5A, the port 1R of the OXC apparatus 100 normally receives an optical signal from a client apparatus and transmits the received optical signal from the port 2T. The port 2R of the OXC apparatus 200 normally receives an optical signal from the OXC apparatus 100 and transmits the received optical signal from the port 5T. The port 2R of the OXC apparatus 400 normally receives an optical signal from the OXC apparatus 200 and transmits the received optical signal from the port 1T to a client apparatus.

The port 1R of the OXC apparatus 400 normally receives an optical signal from the client apparatus and transmits the received optical signal from the port 2T. The port 5R of the OXC apparatus 200 normally receives an optical signal from the OXC apparatus 400 and transmits the received optical signal from the port 2T. The port 2R of the OXC apparatus 100 normally receives an optical signal from the OXC apparatus 200 and transmits the received optical signal from the port 1T to the client apparatus.

Since the OXC apparatuses 100 and 400 do not bridge an optical signal to the auxiliary system, the OXC apparatus 300 within the auxiliary system does not receive or transmit optical signals. However, the OXC apparatus 300 connects the reception port 2R to the transmission port 5T and the reception port 5R to the transmission port 2T. The ports 5R of the OXC apparatuses 100 and 400 do not receive an optical signal and are not connected to any transmission port. Further, the ports 5T are not connected to any reception port.

When a fault occurs between the OXC apparatuses 100 and 200 in the main path as indicated in FIG. 5B, the port 2R of the OXC apparatus 200 detects the fault, the signal output from the port 5T turns OFF, and the port 2R of the OXC apparatus 400 detects the fault and turns OFF the signal output from the port 1T.

In a state indicated in FIG. 5C, the OXC apparatus 400 changes the reception port for connecting to the port 1T from 2R to 5R and the transmission port for connecting to the port 1R from 2T to 5T when the fault is detected by the port 2R. The optical signal transmission to the OXC apparatus 400 from the OXC apparatus 100 is the same as indicated in diagram (b) of FIG. 5. However, the OXC apparatus 400 has switched to an auxiliary transmission port and reception port. Therefore, the port 5R of the OXC apparatus 300 receives an optical signal from the OXC apparatus 400 and transmits the received optical signal to the port 2T. The port 5R of the OXC apparatus 100, which is connected to the port 2T of the OXC apparatus 300, detects an optical signal. However, the cross connect setup change is not completed. Therefore, the port 5R of the OXC apparatus 100 is not cross-connected to the port 1T, which is connected to a client apparatus. Meanwhile, the signal input to the port 5R of the OXC apparatus 200 in the main system turns OFF due to path switching for the OXC apparatus 400. Similarly, the input to the port 2R of the OXC apparatus 100 turns OFF, and the port 1T, which is connected to a client apparatus, also turns OFF.

Next, as indicated n FIG. 5D, when the input to the port 2R of the OXC apparatus 100 turns OFF, the OXC apparatus 100 changes the transmission port for connecting to the port 1R from 2T to 5T, changes the reception port for connecting to the port 1T from 2R to 5R, and selects the auxiliary system. Since the optional signal transmitted from the OXC apparatus 400 has already arrived at the reception port 5R, the client apparatus connected to the OXC apparatus 100 can receive a signal upon auxiliary system selection. Further, the OXC apparatus 300 has not made a cross connect connection change and the OXC apparatus 400 has already selected the auxiliary system. Therefore, the client apparatus connected to the OXC apparatus 400 can receive a signal when the OXC apparatus 100 selects the auxiliary system. Consequently, the path switching process subsequently to fault detection is completed by performing two steps, which are indicated in FIGS. 5C and 5D.

The OXC apparatus configuration and the operations of OXC apparatuses that serve as end office nodes and are positioned at both ends of the path will now be described with reference to FIGS. 6 to 9. In the present embodiment, the OXC apparatuses 100 to 400 are equivalent to each other. Therefore, only the configuration of the OXC apparatus 100, which is shown in FIG. 6A, will be described.

The OXC apparatus 100 comprises an 8-input, 8-output, an optical switch 130, an optical level monitor section 120, and a control section 110. When an optical signal enters a reception port 140, it is partly branched by an optical coupler 160, and then introduced into the optical switch 130. The optical switch 130 outputs eight inputs to one of the eight outputs in compliance with a control signal from the control section 110, and transmits an optical signal from a transmission port 150. The optical signals branched by the optical couplers 160 are collected by the optical level monitor section 120 and converted into electrical signals by a photodiode array (not shown). The optical level monitor section 120 compares the level of the electrical signals against a reference voltage to judge whether the signal is OFF or restored. The judgment result is conveyed to the control section 110. The reference voltage setting for judging whether the signal is restored is higher than the reference voltage setting for judging whether the signal is OFF. These settings are employed to avoid a situation where the signal OFF situation and signal restoration situation are repeatedly encountered.

The control section 110 comprises a CPU 111, a memory 112, a path switching management section 113, and a bus 114, which interconnects the CPU 111, memory 112, and path switching management section 113. A path switching management table, which is recorded in the path switching management section 113, is set up with a net management apparatus, which is a host apparatus. The path switching management table will be described later. In accordance with the monitoring results produced by the optical level monitor section 120 and the information fed from the net management apparatus, the control section 110 references the path switching management table and operates the optical switch 130.

The optical switch connection status concerning the path between the client apparatuses 10 and 30 will now be described. FIGS. 6A and 6B illustrate a state where bidirectional optical signal transmissions are normal with the main system selected. Nought marks put on the optical level monitor section indicate that the input optical signals are normal. A cross mark indicates that the input optical signal is abnormal. FIG. 6A indicates that the optical signal from the client apparatus 10 and the optical signal from the OXC apparatus 200 are normal. FIG. 6A also indicates that the optical signal from the OXC apparatus 300, which belongs to the auxiliary system, is OFF because the main system is selected. The cross connect status of the optical switch 130 is such that the optical signal from the client apparatus 10 is connected to the OXC apparatus 200, and that the optical signal from the OXC apparatus 200 is connected to the client apparatus 10. Although the connection between nodes and a client apparatus are described with reference to FIGS. 6 to 9, there is a WDM apparatus between the nodes as described earlier.

Referring to FIG. 6B, the optical signal from the client apparatus 30 and the optical signal form the OXC apparatus 200 are normal with the main system selected. Therefore, the optical signal from the OXC apparatus 300, which belongs to the auxiliary system, is OFF. Further, the cross connect status of an optical switch 430 is such that the optical signal from the client apparatus 30 is connected to the OXC apparatus 200, and that the optical signal from the OXC apparatus 200 is connected to the client apparatus 30.

FIGS. 7A and 7B illustrate a state where the optical signal transmitted from the client apparatus 10 to client the apparatus 30 in the main path is OFF. In other words, the connection setup for the optical switches 130 and 430 is the same as in the normal state that is indicated in FIGS. 6A and 6B. However, an optical level monitor section 420 has detected an abnormality in the input signal for the port 2R.

FIGS. 8A and 8B illustrate a state where a control section 410 has changed the connection setup for the optical switch 430 because the optical signal transmission from the client apparatus 10 to the client apparatus 30 in the main path has turned OFF. The optical signal from the client apparatus 30 is subjected to a connection change so that it is delivered to the OXC apparatus 300 in the auxiliary system. The connection to the reception section for the client apparatus 30 is changed so that it is routed from the OXC apparatus 300 in the auxiliary system. At this stage, no optical signal flows to the auxiliary system. Therefore, the reception side of the client apparatus 30 continues to be OFF. In accordance with a connection change for the OXC apparatus 400, the optical level monitor section 120 of the OXC apparatus 100 detects that the optical signal from the OXC apparatus 200 in the main system is OFF, and detects that the optical signal from the OXC apparatus 300 in the auxiliary system is restored. When the optical signal from the OXC apparatus 200 in the main system turns OFF, the reception side of the client apparatus 10 turns OFF.

FIGS. 9A and 9B illustrate a state where the control section 110 has changed the connection setup for the optical switch 130 because the optical signal transmission from the client apparatus 30 to the client apparatus 10 in the main path has turned OFF. The optical signal from the client apparatus 10 is subjected to a connection change so that it is delivered to the OXC apparatus 300 in the auxiliary system. The connection to the reception section for the client apparatus 10 is changed so that it is routed from the OXC apparatus 300 in the auxiliary system. Since the optical signal from the client apparatus 30 has already arrived at the optical switch 130, the client apparatus 10 receives the optical signal. In the opposing OXC apparatus 400, too, the optical signal from the client apparatus 10 flows to the auxiliary system. Therefore, the optical level monitor section 420 detects the optical signal. Further, the optical switch 430 has already connected the OXC apparatus 30 in the auxiliary system to the reception side of the client apparatus 30. Therefore, the client apparatus 30 resumes its reception operation. As described above, path switching is completed, fault recovery is achieved, and bidirectional transmission restarts.

The state transition required for path switching will now be described with reference to FIGS. 10 and 11.

FIG. 10 is a switching state transition table. The switching state transition table illustrates the OXC apparatus status, which is defined by a combination four conditions (auxiliary system provision, selected system, main system fault description, and auxiliary system fault description), and the transition destination status prevailing when a possible event occurs.

For example, the "1-1-1-1" field in the switching status ID row indicates that the auxiliary system is provided (1), and that the main system is selected (1), and that the main system is normal (1), and further that the auxiliary system is normal (1). When the main system is used for operation in accordance with the present embodiment, the main and auxiliary systems cannot be both normal because no signal flows to the auxiliary system. Therefore, the associated event fields are crossed out with a slash. This also holds true for the "1-2-1-1" field. For auxiliary system provision, either "Provided" (1) or "Not provided" (2) is used. For the selected system, either "Main" (1) or "Auxiliary" (2) is used. For the main system fault description, either "Normal" (1) or "Abnormal" (2) is used. For the auxiliary system fault description, "Normal" (1), "Abnormal" (2), or "Auxiliary system not provided" (0) is used.

Possible events are (1) Auxiliary XC addition, (2) Auxiliary XC deletion, (3) XC change from main to auxiliary (path switching), (4) XC change from auxiliary to main (path switching), (5) Main system fault detection, (6) Main system fault detection and auxiliary system fault recovery detection, (7) Main system fault recovery detection, (8) Auxiliary system fault detection, (9) Auxiliary system fault detection and main system fault recovery detection, and (10) Auxiliary system fault recovery detection. The switching state transition destination status prevailing upon event occurrence is indicated at the intersection of an OXC apparatus section status column and event. The "-" mark indicates that the associated event does not occur in the associated switching state. For example, (2) Auxiliary XC deletion does not occur in the 2-1-1-0 or 2-1-2-0 state in which the auxiliary system does not exist. Further, (1) Auxiliary XC addition and (2) Auxiliary XC deletion are the results of control that is exercised by a host net management apparatus. In event 3 to 10, the OXC apparatus undergoes autonomous transition.

The start and end points of the switching state transition table shown in FIG. 10 are 1-1-1-2 in which there is no abnormality in the main system with the main system selected or 1-2-2-1 in which there is no abnormality in the auxiliary system with the auxiliary system selected. If the (2) Auxiliary XC deletion event occurs while the auxiliary system is selected, a cross connect change is applied simultaneously to the main system (star mark transition in the figure).

The status of the OXC apparatus 100 and the status of the OXC apparatus 400 will now be confirmed with reference to FIGS. 6 to 9.

FIGS. 6A and 6B illustrate a state where the main path is normal, and the OXC apparatuses 100 and 406 are both in the 1-1-1-2 state. When there is a fault in the main path as indicated in FIGS. 7A and 7B, the OXC apparatus 100 remains in the 1-1-1-2 state, and the OXC apparatus 400 detects the fault in the main system and switches to the 1-1-2-2 state. In the switching-in-progress state shown in FIGS. 8A and 8B, the OXC apparatus 100 detects a fault in the main system and the auxiliary system's fault recovery and then switches to the 1-1-2-1 state, whereas the OXC apparatus 400 performs path switching to select the auxiliary system and switches to the 1-2-2-2 state. In the switching completion state shown in FIGS. 9A and 9B, OXC apparatus 100 performs path switching to select the auxiliary system and then switches to the 1-2-2-1 (selected system: auxiliary system; auxiliary system: normal) state, whereas the OXC apparatus 400 detects the auxiliary system's recovery and then switches to the 1-2-2-1 (selected system: auxiliary system; auxiliary system: normal) state.

FIG. 11 is a state transition diagram that illustrates the switching state transition table shown in FIG. 10 in an easy-to-understand manner. FIG. 11 will now be described in comparison to FIG. 10. First of all, the situation where the auxiliary system is not provided is not taken into consideration. Three different selection states in which the main system is selected are arranged in the upper area of the figure with the "main system normal" situation positioned at the center. The corresponding three different selection states in which the auxiliary system is selected are arranged in the lower area of the figure. Transitions corresponding to events 3 to 8, which are enumerated in FIG. 10, are indicated by arrows with an event number. An OXC apparatus transition route whose switching cause is detected earlier at the time of a selected system change from the main system to the auxiliary system is indicated by arrow A, which is drawn by a thick solid line. An OXC apparatus transition route related to opposing side switching is indicated by arrow A', which is drawn by a thick two-dot chain line. Further, an OXC apparatus transition route whose switching cause is detected earlier at the time of a selected system change from the auxiliary system to the main system is indicated by arrow B, which is drawn by a thick one-dot solid line. An OXC apparatus transition route related to opposing side switching is indicated by arrow B', which is drawn by a thick broken line.

The path switching management table to be recorded in the path switching management section shown in FIGS. 6 to 9 will now be described with reference to FIGS. 12 to 15.

FIGS. 12 to 15 illustrate the contents of the path switching management table for (a) the OXC apparatus 100, (b) the OXC apparatus 200, (c) the OXC apparatus 300, and (d) the OXC apparatus 400, which prevail in the (1) Main Path Normal state, (2) Main Path Faulty state, (3) Switching-In-Progress state, or (4) Switching Completed state. When FIG. 13 is positioned to the right of FIG. 12, the status of each node can be confirmed in the (1) Main Path Normal state and (2) Main Path Faulty state. When FIG. 14 is positioned below FIG. 12 with FIG. 15 positioned to the right of FIG. 14, the status of each node can be confirmed in the (3) Switching-In-Progress state and (4) Switching Completed state. Further, the contents of the path switching management table for each OXC apparatus, which prevail in various states of each node, can be chronologically confirmed.

The method for viewing the figures will now be described with reference to table (1)-(a) in FIG. 12. The column of a path index 710 indicates a path reference number. In the present embodiment, only the path between the client apparatuses 10 and 30 in FIG. 2 is considered. Therefore, the reference number is limited to "0001". The column of a port number 720 indicates a port number of the OXC apparatus 100. The column of a direction 730 indicates the direction of a port. The letter "R" represents reception, where as the letter "T" represents transmission. The column of a local port fault status 740 indicates whether the signal at a reception port is normal or not. The column of a main XC 750 indicates an associated main connection port, whereas the column of an auxiliary XC 760 indicates an associated auxiliary connection port. The hyphen mark in the auxiliary XC column indicates that there is no auxiliary connection destination. The column of a local port selection status 770 indicates whether the local port belongs to a selected system or nonselected system. The expression "D.C." stands for "Don't Care" and means that the currently considered path is irrelevant.

Referring to FIGS. 6A and 6B, the control section 110 of the OXC apparatus 100 receives the information about a path index, main path connection source, and main path connection destination from the net management apparatus. The control section 110 writes "0001" in the port 1 and port 2 path index fields of a path switching table 700 in the path switching management section 113. Subsequently, the control section 110 writes "2T", "2R", "1T", and "1R", which are connection destinations, in the port 1R, port 1T, port 2R, and port 2T main XC fields of the path switching table 700. Further, the control section 110 writes "Selected" in the port 1R, port 1T, port 2R, and port 2T local port selection status fields of the path switching management table 700.

Next, the control section 110 of the OXC apparatus 100 receives the information about a path index, auxiliary path connection source, and auxiliary path connection destination from the net management apparatus. The control section 110 writes "0001" in the port 5 path index fields 710 of the path switching table 700 in the path switching management section 113. Subsequently, the control section 110 writes "1T" and "2R", which are connection destinations, in the port 5R and port 5T main XC fields of the path switching table 700. Further, the control section 110 writes "5T" and "5R", which are connection destinations, in the port 1R and port 1T auxiliary XC fields 760 of the path switching table 700. Furthermore, the control section 110 writes "Nonselected" in the port 5R and port 5T local port selection status fields of the path switching management table 700.

The cross connect setup rules for the OXC apparatuses according to the present embodiment are such that R and T ports that have the same path index and are marked "Selected" in the local port selection status fields are connected. Therefore, as indicated by arrows outside the fields, the port 1R is connected to the port 2T and the port 2R is connected to the port 1T.

When the connection is completed, the optical level monitor section 120 shown in FIGS. 6A and 6B starts a monitoring operation. The obtained monitoring results are written in the local port fault status column 740 of the path switching management table 700. More specifically, the optical level monitor section 120 notifies the control section 110 that the optical signals received by the ports 1R and 2R are normal with the port 5R turned OFF. In accordance with such a notification, the control section 110 writes "Normal" in the port 1R and port 2R local port fault status fields 740 of the path switching management table 700 and "OFF" in the port 5R local port fault status field 740. "Normal" and "OFF" are written when a status change occurs.

The procedure for selecting "Selected" or "Nonselected" as the local port selection status will now be described.

When the local port fault status of each port is "Normal", the control section of an OXC apparatus does nothing. The control section does nothing even when the local port fault status of each port is "OFF" and the local port selection status is "Nonselected". When the local port fault status of each port is "OFF" and the local port selection status is "Selected", the control section references the main XC and auxiliary XC for a connected port. If the connected port is provided with the main XC and not provided with the auxiliary XC, the control section does nothing. When the connected port is provided with the main XC and auxiliary XC, the control section changes the local port selection status of each remote connection destination port from "Nonselected" to "Selected", and changes the local port selection status of each local port from "Selected" to "Nonselected".

If the local port fault status is "OFF" and the local port selection status is "Nonselected", it represents, for instance, the status of the port 5R of the OXC apparatus 100 when the main path is normal. If the local port fault status is "OFF", the local port selection status is "Selected", and the connection destination port is for the main XC only, it represents, for instance, the port 2R of the OXC apparatus 200, which is a relay node prevailing when the main path is faulty. When a change is to be made from "Nonselected" to "Selected" or from "Selected" to "Nonselected", path switching is performed.

More specifically, the port 2R of the OXC apparatus 100 detects an "OFF" state in the (3) Switching-In-Progress state shown in FIG. 14. However, since the "Selected" state prevails, the port 2R references the main XC and auxiliary XC for the connection destination port 1T and finds the port 5R, which differs from the local port (2R). In the (4) Switching Completed state, the local port selection status of each OXC apparatus port 5 is changed to "Selected", and the local port selection status of each port 2 is changed to "Nonselected".

In accordance with the aforementioned cross connect setup rules, switching is performed from 1R to 5T and from 5R to 1T as indicated by arrows.

The aforementioned local port selection status change from "Selected" to "Nonselected" and vice versa will now be described with reference to FIG. 16. The steps indicated in the flowchart in FIG. 16 are performed by the control section of an OXC apparatus.

First of all, i is set to "1" (step 801). The local port fault status of an iR port is then read to judge whether it is "OFF" (step 802). If the query in step 802 is answered "No", i is incremented (step 809). If, on the other hand, the query in step 802 is answered "Yes", the local port selection status of the iR port is read to judge whether it is "Selected" (step 803). If the query in step 803 is answered "No", the flow proceeds to step 809 in which i is incremented. If, on the other hand, the query in step 803 is answered "Yes", the main XC value of the iR port is read. It is assumed that the value is jT (step 804). Next, step 805 is performed to read the main XC and auxiliary XC for the jT port. Step 806 is then performed to judge whether the main XC and auxiliary XC for the jT port contain a value other than iR. If the query in step 806 is answered "No", the flow proceeds to step 809 in which i is incremented. If, on the other hand, the query in step 806 is answered "Yes", it is assumed that a port other than the port iR is kR (step 807). Further, step 808 is performed to choose "Selected" as the local port selection status of each k port and "Nonselected" as the local port selection status of each i port. The flow then proceeds to step 809 in which i is incremented. After completion of step 809 in which i is incremented, step 810 is performed to judge whether the value i is 9 or greater. If the query in step 810 is answered "Yes", the flow returns to step 801 in which i is set to "1". If not, the flow returns to step 802.

Steps 804 to 806 are performed, when a fault is detected at a path connection destination, to find another path connection destination. However, the present invention is not limited to the flowchart in FIG. 16. For example, the following procedure is also applicable to the present invention.

First of all, a port number having the same path index is searched for. If the obtained result indicates that only one port has the same path index in addition to the local port, it means that a fixed connection is used. Therefore, the flow proceeds to step 809. If the obtained result indicates that two ports have the same path index in addition to the local port, step 808 should be performed to switch between "Selected" and "Nonselected" for a port number irrelevant to the local port connection destination.

The present embodiment provides an OXC apparatus that switches both the reception side and transmission side to a nonselected system when a fault is detected. Further, the present embodiment provides an OXC apparatus that does not switch the reception side or transmission side to a nonselected system when a fault is detected. Further, a control method for exhibiting a wire breakage fault, which is a de facto standard for a WDM net, is used with an optical signal flowing to only one selected system (main or auxiliary system). When a fault occurs in the selected system, a relay node allows the fault to propagate, and an end office node detects the fault. The end office node detecting the fault switches to a nonselected transmission side as well as to a nonselected reception side, which is affected by the fault. Therefore, an end office node facing the end office node that has detected the fault also detects the fault and can switch to a nonselected system. This ensures that optical level path switching can be performed.

The present invention provides an optical cross connect apparatus and optical transmission system that are capable of performing optical level path switching.

What is claimed is:

1. An optical cross connect apparatus for allocating optical signals from first to third reception ports to first and second transmission ports;
    wherein, when an optical signal fed from the first reception port is found to be OFF, connection between the first reception port and the first transmission port is maintained; and
    when an optical signal fed from the second reception port is found to be OFF, connection source for the second transmission port which is connected to the second reception port, is changed from the second reception port to the third reception port;
    further comprising:
    an optical switch for associating optical signals fed from the first to third reception ports with the first and second transmissions ports;
    an optical level monitor section for monitoring optical levels of said optical signals fed from the first to third reception ports; and
    a control section for controlling said optical switch in accordance with results of monitoring by said optical level monitor section;
    wherein said control section includes a path switching management section for recording a path switching management table, references said path switching management table when said optical level monitor section detects that one of optical input signals fed from the first to third reception ports is OFF, and judges whether said optical switch should be operated.

2. The optical cross connect apparatus according to claim 1, wherein a reception port that maintains connection to a transmission port when an optical signal OFF state is detected and a reception port that changes the connection to a transmission port when an optical signal OFF state is detected can be arbitrarily defined.

3. An optical cross connect apparatus for allocating optical signals from first to third reception ports to first and second transmission ports;
    wherein, when an optical signal fed from the first reception port is found to be OFF, connection between the first reception port and the first transmission port is maintained; and
    when an optical signal fed from the second reception port is found to be OFF, connection source for the second transmission port, which is connected to the second reception port, is changed from the second reception port to the third reception port;
    wherein a reception port that maintains connection to a transmission port when an optical signal OFF state is detected and a reception port that changes the connection to a transmission port when an optical signal OFF state is detected can be arbitrarily defined:
    further comprising:
    an optical switch for associating optical signals fed from the first to third reception pods with the first and second transmissions ports;
    an optical level monitor section for monitoring optical levels of said optical signals fed from the first to third reception ports; and
    a control section for controlling said optical switch in accordance with results of monitoring by said optical level monitor section,
    wherein said control section includes a path switching management section for recording a path switching management table, references said path switching management table when said optical level monitor section detects that one of optical input signals fed from the first to third reception ports is OFF, and judges whether said optical switch should be operated.

* * * * *